United States Patent
Moon et al.

(10) Patent No.: US 10,674,112 B2
(45) Date of Patent: Jun. 2, 2020

(54) DISPLAY DRIVER CIRCUIT FOR ADJUSTING FRAMERATE TO REDUCE POWER CONSUMPTION

(71) Applicant: SAMSUNG ELECTRONICS CO., LTD., Suwon-si (KR)

(72) Inventors: Young-Bae Moon, Yongin-si (KR); Junho Park, Yongin-si (KR); Sang-Min Lee, Hwaseong-si (KR); Seongmin Cheon, Hwaseong-si (KR); Kyoung Hwan Kwon, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 16/415,100

(22) Filed: May 17, 2019

(65) Prior Publication Data

US 2020/0092516 A1 Mar. 19, 2020

(30) Foreign Application Priority Data

Sep. 18, 2018 (KR) .................. 10-2018-0111522
Dec. 6, 2018 (KR) .................. 10-2018-0156157

(51) Int. Cl.
| | | |
|---|---|---|
| G06F 1/3234 | (2019.01) | |
| H04N 7/01 | (2006.01) | |
| H04N 7/56 | (2006.01) | |
| G06F 3/047 | (2006.01) | |
| G06F 3/041 | (2006.01) | |

(52) U.S. Cl.
CPC ......... *H04N 7/0127* (2013.01); *G06F 1/3265* (2013.01); *G06F 3/047* (2013.01); *G06F 3/0412* (2013.01); *H04N 7/56* (2013.01)

(58) Field of Classification Search
CPC ...... H04N 7/0127; H04N 7/56; G06F 1/3265; G06F 3/0412; G06F 3/047
See application file for complete search history.

(56) References Cited

U.S. PATENT DOCUMENTS

| | | |
|---|---|---|
| 8,390,613 B2 | 3/2013 | Park et al. |
| 9,019,189 B2 | 4/2015 | Choi |
| 9,495,900 B2 | 11/2016 | Tanaka et al. |
| 9,886,150 B2 | 2/2018 | Yamamoto et al. |
| 2018/0040301 A1 | 2/2018 | Bae et al. |

FOREIGN PATENT DOCUMENTS

| | | |
|---|---|---|
| JP | 2017-53926 A | 3/2017 |
| KR | 10-2006-0018393 A | 3/2006 |
| KR | 10-1622207 B1 | 5/2016 |
| KR | 10-2016-0078596 A | 7/2016 |
| KR | 10-2018-0015038 A | 2/2018 |

*Primary Examiner* — Stacy Khoo
(74) *Attorney, Agent, or Firm* — Sughrue Mion, PLLC

(57) ABSTRACT

A display driver circuit includes a source driver configured to output display data to data lines, a controller configured to control the source driver, based on a synchronization signal, and a frequency adjusting circuit configured to extend a first time interval of the synchronization signal from a first length to a second length, such that time interval in which the display data is not output to the data lines is extended, when second image data are not received from an external device during a reference time interval after first image data are received from the external device, and shorten the first time interval, from the second length to a third length, when an instruction is received from the external device after the first time interval is extended to the second length.

20 Claims, 14 Drawing Sheets

DISPLAY DRIVER CIRCUIT FOR ADJUSTING FRAMERATE TO REDUCE POWER CONSUMPTION

CROSS-REFERENCE TO RELATED APPLICATIONS

This application claims priority from Korean Patent Application No. 10-2018-0111522 filed on Sep. 18, 2018, and Korean Patent Application No. 10-2018-0156157 filed on Dec. 6, 2018, in the Korean Intellectual Property Office, the disclosures of which are incorporated by reference herein by reference in their entireties.

BACKGROUND

Apparatuses and methods consistent with embodiments relate to an electronic circuit, and more particularly, relate to a display driver circuit for driving a display panel.

Most electronic devices include a display device. An electronic device may provide a user with an image through a display device. The display device may be implemented in various forms such as a liquid crystal display (LCD), a light emitting diode (LED) display, an organic LED (OLED) display, and an active matrix OLED (AMOLED) display. The display device provides an image to the user through a display panel. A display driver circuit operates to display an image in the display panel. Nowadays, as the size and resolution of the display panel increases, power consumption of the display driver circuit is increasing.

For example, most electronic devices that are being used nowadays are implemented to be portable or movable by the user. The electronic devices operate based on a power from a battery. An increase in power consumption of the display driver circuit may make it difficult for an electronic device to operate based on the battery power for a long time. Accordingly, it is desired to reduce power consumption of the display driver circuit.

SUMMARY

According to embodiments, there is provided a display driver circuit including a source driver configured to output display data to data lines, a controller configured to control the source driver, based on a synchronization signal, and a frequency adjusting circuit configured to extend a first time interval of the synchronization signal from a first length to a second length, such that time interval in which the display data is not output to the data lines is extended, when second image data are not received from an external device during a reference time interval after first image data are received from the external device, and shorten the first time interval, from the second length to a third length, when an instruction is received from the external device after the first time interval is extended to the second length.

According to embodiments, there is provided a display driver circuit including a source driver configured to output display data to data lines connected to pixels, a controller configured to control the source driver, based on a synchronization signal, a power controller configured to turn off the source driver during a first time interval, based on the synchronization signal, and a frequency adjusting circuit configured to increase a period of the synchronization signal, from a first value to a second value, such that the first time interval is extended, when second image data are not received from an external device during a reference time interval after first image data are received from the external device, and reduce the period of the synchronization signal, from the second value to a third value, when the second image data are received from the external device.

According to embodiments, there is provided a display driver circuit including a source driver configured to output display data to data lines, a controller configured to control the source driver, based on a synchronization signal, and a frequency adjusting circuit configured to lower a frequency of the synchronization signal, from a first value to a second value, when second image data are not received from an external device during a reference time interval after first image data are received from the external device, increase the frequency of the synchronization signal, from the second value to a third value, when the second image data are received from the external device, and adjust the frequency of the synchronization signal, such that time interval in which the display data are output is maintained.

DETAILED DESCRIPTION

Below, embodiments of the inventive concept may be described in detail and clearly to such an extent that an ordinary one in the art easily implements the inventive concept.

Embodiments of the inventive concept provide a display driver circuit for reducing power consumption by adjusting a frame rate. In this regard, in embodiments, the display driver circuit may extend a vertical porch interval of a signal vsync, while still image data are received, and may turn off a source driver and/or a scan driver in the extended vertical porch interval.

Figure 1:
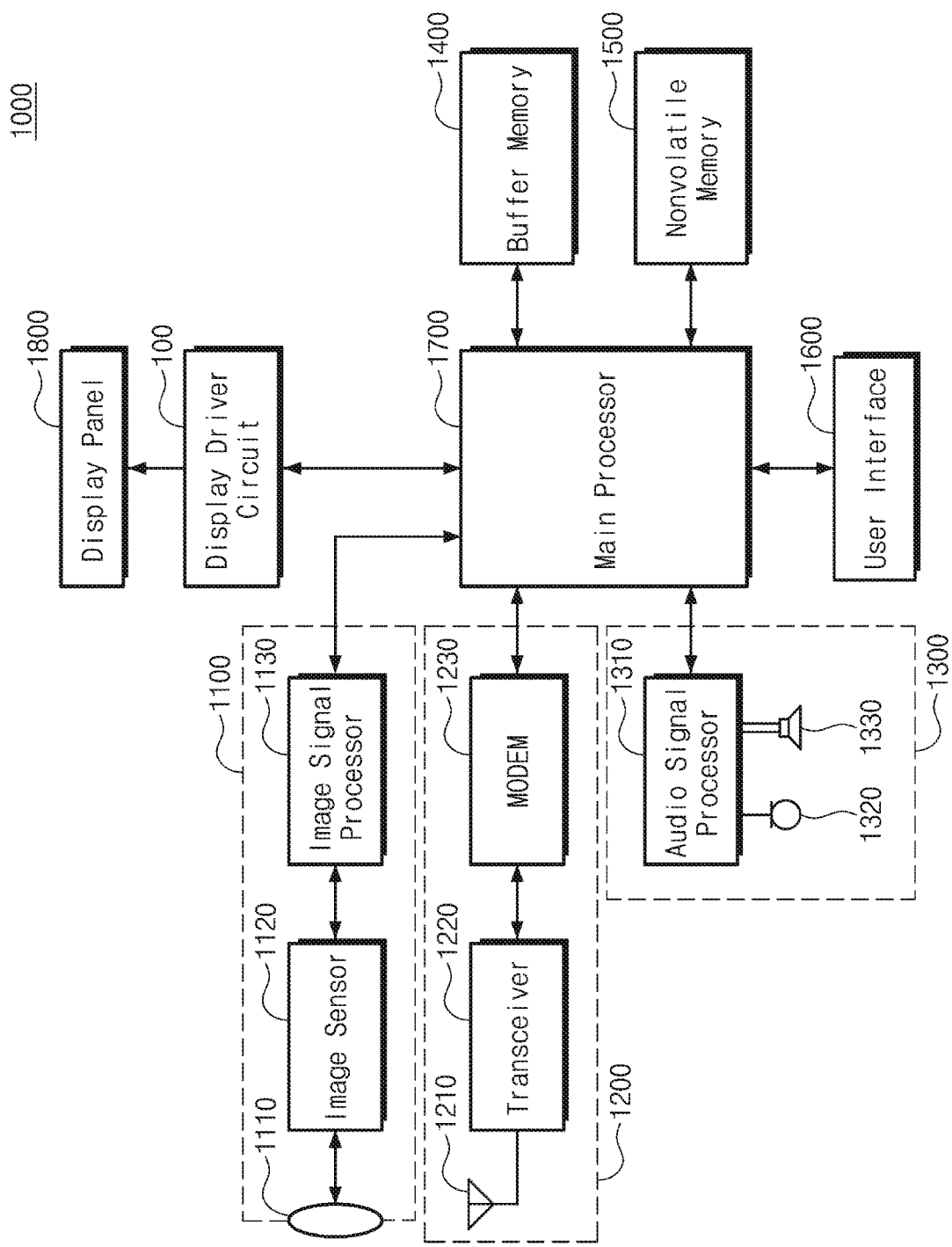
FIG. 1 is a block diagram illustrating an electronic device including a display driver circuit according to embodiments of the inventive concept.

FIG. 1 is a block diagram illustrating an electronic device 1000 including a display driver circuit according to embodiments of the inventive concept. For example, the electronic device 1000 may be implemented with one of various types of electronic devices such as a smartphone, a tablet personal computer (PC), a laptop PC, an e-book reader, an MP3 player, a wearable device, etc.

The electronic device 1000 may include various electronic circuits. For example, the electronic circuits of the electronic device 1000 may include a display driver circuit 100, a display panel 1800, an image processing block 1100, a communication block 1200, an audio processing block 1300, a buffer memory 1400, a nonvolatile memory 1500, a user interface 1600, and a main processor 1700.

The image processing block 1100 may receive a light through a lens 1110. An image sensor 1120 and an image signal processor 1130 included in the image processing block 1100 may generate image data associated with an external subject, based on the received light.

The communication block 1200 may exchange signals with an external device/system through an antenna 1210. A transceiver 1220 and a MODEM (Modulator/Demodulator) 1230 of the communication block 1200 may process signals, which are exchanged with the external device/system, in compliance with various wireless communication protocols.

The audio processing block 1300 may process sound information by using an audio signal processor 1310, thus playing and outputting the audio. The audio processing block 1300 may receive an audio input through a microphone 1320. The audio processing block 1300 may output the played audio through a speaker 1330.

The buffer memory 1400 may store data that are used for an operation of the electronic device 1000. For example, the buffer memory 1400 may temporarily store data processed or to be processed by the main processor 1700. For example, the buffer memory 1400 may include a volatile memory such as a static random access memory (SRAM), a dynamic RAM (DRAM), or a synchronous DRAM (SDRAM), and/or a nonvolatile memory such as a phase-change RAM (PRAM), a magneto-resistive RAM (MRAM), a resistive RAM (ReRAM), or a ferroelectric RAM (FRAM).

The nonvolatile memory 1500 may store data regardless of whether a power is supplied. For example, the nonvolatile memory 1500 may include any one or any combination of various nonvolatile memories such as a flash memory, a PRAM, an MRAM, a ReRAM, and a FRAM. For example, the nonvolatile memory 1500 may include a removable memory such as a secure digital (SD) card, and/or an embedded memory such as an embedded multimedia card (eMMC).

The user interface 1600 may arbitrate communication between a user and the electronic device 1000. For example, the user interface 1600 may include input interfaces such as a keypad, a button, a touch screen, a touch pad, a gyroscope sensor, a vibration sensor, and an acceleration sensor. For example, the user interface 1600 may include output interfaces such as a motor and a LED lamp.

The main processor 1700 may control overall operations of the components of the electronic device 1000. The main processor 1700 may process various operations for the purpose of operating the electronic device 1000. For example, the main processor 1700 may be implemented with an operation processing device/circuit, which includes one or more processor cores, such as a general-purpose processor, a special-purpose processor, an application processor, or a microprocessor. For example, the main processor 1700 may transmit data to the display driver circuit 100.

The display driver circuit 100 may receive data from the main processor 1700. The display driver circuit 100 may drive the display panel 1800 based on the received data. The display panel 1800 may display a video or a still image based on the received data.

The display driver circuit 100 may adjust a driving frequency depending on whether a video is displayed in the display panel 1800 or whether a still image is displayed in the display panel 1800. In this regard, configurations and operations of an external device, the display driver circuit 100 and the display panel 1800 will be described with reference to FIGS. 2 to 14.

However, the components illustrated in FIG. 1 are provided for better understanding, and are not intended to limit the inventive concept. The electronic device 1000 may not include one or more of the components illustrated in FIG. 1 or may further include at least one component not illustrated in FIG. 1.

Figure 2:
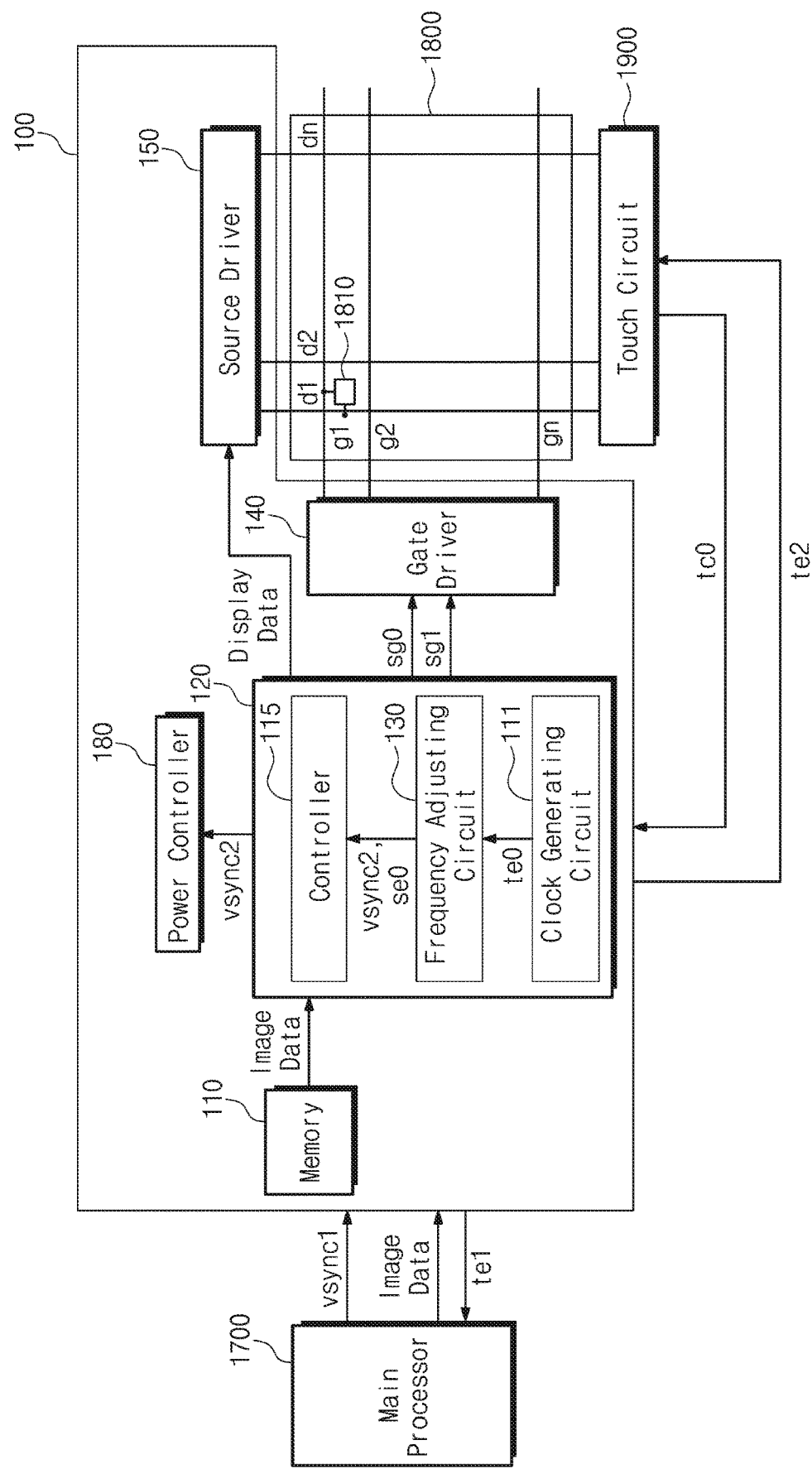
FIG. 2 is a block diagram illustrating a display driver circuit of FIG. 1.

FIG. 2 is a block diagram illustrating the display driver circuit 100 of FIG. 1.

As described with reference to FIG. 1, the main processor 1700 may output image data to the display driver circuit 100. The display driver circuit 100 may receive image data. The display driver circuit 100 may display an image in the display panel 1800 based on the received image data.

The display driver circuit 100 may output a signal te1. The signal te1 may be a signal that is output periodically. The signal te1 will be more fully described with regard to a configuration and an operation of the display driver circuit 100.

The main processor 1700 may receive the signal te1. The main processor 1700 may output a synchronization signal vsync1 and image data in response to the signal te1. The main processor 1700 may output both the synchronization signal vsync1 and the image data or may output only the synchronization signal vsync1. For example, the synchronization signal vsync1 may be a vertical synchronization signal.

In detail, while a video is displayed in the display panel 1800, the main processor 1700 may output both the synchronization signal vsync1 and the image data. In this case, the main processor 1700 may periodically output the synchronization signal vsync1 and the image data in response to the signal te1. While a still image is displayed in the display panel 1800, the main processor 1700 may output only the synchronization signal vsync1 without the image data. In this case, the main processor 1700 may periodically output only the synchronization signal vsync1 without the image data in response to the signal te1. Only the synchronization signal vsync1 is illustrated in FIG. 2, but the inventive concept is not limited thereto. For example, the main processor 1700 may output a horizontal synchronization signal hsync, a clock clk, etc., to drive the display driver circuit 100. However, in the following descriptions, it is assumed that the horizontal synchronization signal hsync, the clock clk, etc. are generated in the display driver circuit 100.

In the following descriptions, in the case in which the main processor 1700 outputs only the synchronization signal vsync1 without image data, previously output image data are expressed as still image data. Also, in the case in which the main processor 1700 outputs both the synchronization signal vsync1 and the image data, previously output image data are expressed as video data.

The display driver circuit 100 may receive the synchronization signal vsync1 and/or the image data. The display driver circuit 100 may display an image in the display panel 1800 based on the received synchronization signal vsync1 and the received image data.

The display driver circuit 100 may include a memory 110, a timing controller 120, a gate driver 140, a source driver 150, and a power controller 180. The timing controller 120, the gate driver 140, and the source driver 150 may be included in one chip.

The memory 110 may receive image data. The memory 110 may store the received image data. The memory 110 may output stored image data, to the timing controller 120. In the case in which still image data are received, the memory 110 may repeatedly output previously stored still image data until new image data are received. Also, the memory 110 may not perform an operation of storing image data until new image data are received.

The timing controller 120 may control the gate driver 140, the source driver 150, and the power controller 180, based on image data received from the main processor 1700. The timing controller 120 may include a clock generating circuit 111, a frequency adjusting circuit 130, and a controller 115. However, the inventive concept is not limited to the case in which the clock generating circuit 111, the frequency adjusting circuit 130, and the controller 115 are implemented with a hardware circuit. The inventive concept may be variously changed or modified. For example, the clock generating circuit 111, the frequency adjusting circuit 130, and the controller 115 may be implemented by software to perform operations to be described in the disclosure. In this case, a processor that may execute a program code of the software may be provided inside or outside the display driver circuit 100, and the processor may execute the program code of the software such that operations of the clock generating circuit 111, the frequency adjusting circuit 130, and the controller 115 are performed.

The clock generating circuit 111 may generate signals te0, te1, and te2. The signals te0, te1, and te2 may be signals having the same frequency. The signal te0 may be a clock clk used to drive the components 110, 115, 130, 140, 150, and 180 of the display driver circuit 100. The signals te1 and te2 may be signals for synchronization between the main processor 1700 and a touch circuit 1900 and the display driver circuit 100. For example, a frequency of the signals te0, te1, and te2 may be 60 Hz.

The clock generating circuit 111 may output the signal te1 to the main processor 1700. The main processor 1700 may output the synchronization signal vsync1 and image data in response to the signal te1. That is, a period at which the synchronization signal vsync1 is output may correspond to a period of the signal te1.

The clock generating circuit 111 may output the signal te2 to the touch circuit 1900. The touch circuit 1900 may receive the signal te2. The touch circuit 1900 may output a signal tc0 in response to the signal te2.

In the case of intending to convert an image to be displayed in the display panel 1800, the user may touch a touch panel. The touch panel may be electrically connected with the touch circuit 1900. Accordingly, in the case in which the touch panel is touched, the touch circuit 1900 may recognize that the touch panel is touched. In the case in which the signal te2 is received after the touch panel is touched, the touch circuit 1900 may output the signal tc0 in response to the signal te2.

The clock generating circuit 111 may output the signal te0 to the components 110, 115, 130, 140, 150, and 180 of the display driver circuit 100. The signal te0 may be used for the components 110, 115, 130, 140, 150, and 180 in the display driver circuit 100 to operate. For example, the memory 110 may output image data stored therein depending on a frequency of the signal te0. The clock generating circuit 111 may output the signal te0 to the frequency adjusting circuit 130.

The frequency adjusting circuit 130 may receive the signals vsync1 and te0 and image data. In the case in which image data are not received during a reference time interval, the frequency adjusting circuit 130 may output a synchronization signal vsync2 having a frequency lower than a frequency of the synchronization signal vsync1. The frequency adjusting circuit 130 may output a signal se0 by using the signals vsync1, vsync2, and te0. A configuration and an operation of the frequency adjusting circuit 130 will be in detail described with reference to FIG. 3.

The controller 115 may receive the signals vsync2 and se0. The controller 115 may receive image data stored in the memory 110. The controller 115 may control the gate driver 140 and the source driver 150 based on the signals vsync2 and se0 and the image data. The controller 115 may output display data and signals sg0 and sg1 for the purpose of controlling the gate driver 140 and the source driver 150, respectively.

The gate driver 140 may receive the signals sg0 and sg1. The source driver 150 may receive the display data. The gate driver 140 may drive gate lines g1 to gn based on the signals sg0 and sg1. The gate driver 140 may select a gate line based on the signal sg0. The gate lines g1 to gn may be sequentially selected by the signal sg0. The source driver 150 may drive data lines d1 to dn based on the display data. The source driver 150 may input voltages corresponding to the display data to the data lines d1 to dn. Only one pixel 1810 is illustrated in FIG. 1, but the inventive concept is not limited thereto. Pixels may be placed at intersections of the gate lines g1 to gn and the data lines d1 to dn. A pixel selected by the signal sg0 may store charges corresponding to a voltage input from the source driver 150.

The gate driver 140 may select a gate line based on the signal sg1. Pixels placed at the selected gate line may output charges stored therein. Accordingly, currents may be output from the pixels. In the case in which currents are output from pixels, a light of luminance corresponding to the voltages input to the pixels may be emitted.

The power controller 180 may receive the synchronization signal vsync2. The power controller 180 may turn off and turn on a part of components of the gate driver 140, and the source driver 150 based on the synchronization signal vsync2. An operation of the power controller 180 will be described with reference to FIGS. 4 and 5.

Figure 3:
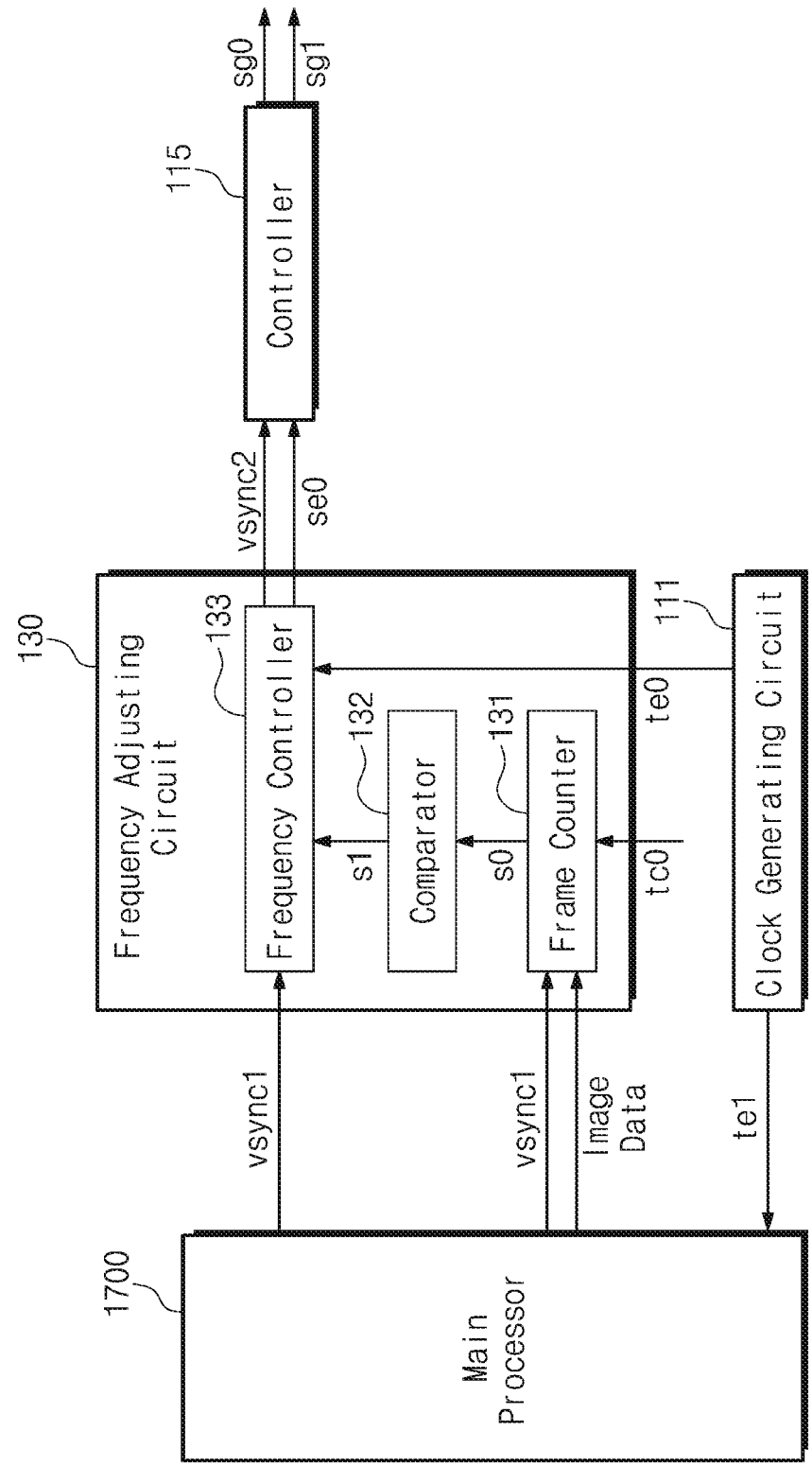
FIG. 3 is a block diagram illustrating a frequency adjusting circuit of FIG. 2.

FIG. 3 is a block diagram illustrating the frequency adjusting circuit 130 of FIG. 2.

The frequency adjusting circuit 130 may determine whether image data are not received during a reference time interval. The frequency adjusting circuit 130 may output the signals vsync2 and se0 based on a result of the determination. The frequency adjusting circuit 130 may include a frame counter 131, a comparator 132, and a frequency controller 133. The frame counter 131, the comparator 132, and the frequency controller 133 may be implemented with a hardware circuit and/or by software to provide operations to be described in the disclosure. For example, a processor that may execute a program code of the software may be provided inside or outside the display driver circuit 100, and the processor may execute the program code of the software such that operations of the frame counter 131, the comparator 132, and the frequency controller 133 are performed.

The frame counter 131 may receive the synchronization signal vsync1 and the image data. While still image data are output from the main processor 1700, the main processor 1700 may output only the synchronization signal vsync1 without the image data for a while. The frame counter 131 may count the number of times that the synchronization signal vsync1 is received without image data. Also, the frame counter 131 may count the number of times that the memory 110 of FIG. 1 outputs image data without a process of storing new image data. In the following descriptions, the number of times that the synchronization signal vsync1 is received without image data may correspond to the number of times that the memory 110 outputs image data without a process of storing new image data.

However, the inventive concept is not limited thereto. For example, the main processor 1700 may continuously output the same still image data. In this case, the frame counter 131 may count the number of times that the same still image data are received. The frame counter 131 may analyze image data and may determine whether pieces of image data continuously received are identical to each other. In the following descriptions, an operation in which the frame counter 131 counts the number of times that the synchronization signal vsync1 is received without image data may correspond to an operation in which the frame counter 131 counts the number of times that the same still image data are received. The frame counter 131 may output a signal s0. The signal s0 may include information about the counted number of times. In the case in which image data are input to the frame counter 131, the signal s0 may include information indicating that image data are received.

Also, the frame counter 131 may receive the signal tc0. In the case in which the signal tc0 is input to the frame counter 131, the signal s0 may include information indicating that the signal tc0 is received. A description associated with that the signal tc0 is received will be given with reference to FIGS. 8 to 11.

Also, the frame counter 131 may receive an instruction. In the case in which the instruction is input to the frame counter 131, the signal s0 may include information indicating that an instruction is received. A description associated with that an instruction is received will be given with reference to FIGS. 12 to 14.

The comparator 132 may receive the signal s0. The comparator 132 may compare the counted number of times and a reference count based on the signal s0. The comparator 132 may output a signal s1 based on a result of the comparison. The comparator 132 may determine a logical value of the signal s1 based on the comparison result. For example, in the case in which the counted number of times is greater than the reference count, the comparator 132 may output the signal s1 having a value of logic "1." In the case in which the counted number of times is smaller than the reference count, the comparator 132 may output the signal s1 having a value of logic "0." Also, when information indicating that image data are received is included in the signal s0, the comparator 132 may again output the signal s1 having a value of logic "0." When information indicating that the signal tc0 is received is included in the signal s0, the comparator 132 may again output the signal s1 having a value of logic "0." Also, when information indicating that an instruction is received is included in the signal s0, the comparator 132 may again output the signal s1 having a value of logic "0." However, the inventive concept is not limited thereto. For example, the signal s1 may have a voltage level corresponding to a logical value.

In the following descriptions, comparing the counted number of times and the reference count may mean comparing a time when the synchronization signal vsync1 is received without image data with a reference time. Also, that the counted number of times is greater than the reference count may mean that a time when the synchronization signal vsync1 is received without image data is greater than the reference time.

In the following descriptions, that the signal s1 has a value of logic "0" may mean that the counted number of times is smaller (or not greater) than the reference count. Also, that the signal s1 has a value of logic "1" may mean that the counted number of times is not smaller (or greater) than the reference count or that new image data are received.

The frequency controller 133 may receive the signals s1, vsync1, and te0. The frequency controller 133 may output the signals vsync2 and se0 based on the signals s1, vsync1, and te0.

The frequency controller 133 may adjust a frequency of the synchronization signal vsync2 depending on a logical value of the signal s1. In the case in which the signal s1 has a value of logic "1," the frequency controller 133 may output the synchronization signal vsync2 having a frequency lower than a frequency of the synchronization signal vsync1. For example, a frequency of the synchronization signal vsync1 may be 60 Hz, and a frequency of the synchronization signal vsync2 may be 48 Hz.

In this case, a time length of a display interval of the synchronization signal vsync2 may be identical to a time length of a display interval of the synchronization signal vsync1. A time length of a porch interval of the synchronization signal vsync2 may be longer than a time length of a porch interval of the synchronization signal vsync1. That is, the frequency controller 133 may extend a time length of the porch interval of the synchronization signal vsync2 while maintaining a time length of the display interval of the synchronization signal vsync2. The frequency controller 133 may make a frequency of the synchronization signal vsync2 low by extending a time length of the porch interval of the synchronization signal vsync2. A time length of the display interval of the synchronization signal vsync2 may correspond to a time length of an interval in which display data are output from the source driver 150 of FIG. 2. A time length of the porch interval of the synchronization signal vsync2 may correspond to a time length of an interval in which display data are not output from the source driver 150 of FIG. 2.

In the case in which the signal s1 has a value of logic "0," the frequency controller 133 may output the synchronization signal vsync2 having the same frequency as a frequency of the synchronization signal vsync1. For example, a frequency of the synchronization signal vsync1 and a frequency of the synchronization signal vsync2 may be 60 Hz.

In this case, a time length of the display interval of the synchronization signal vsync2 may be identical to a time length of the display interval of the synchronization signal vsync1. A time length of the porch interval of the synchronization signal vsync2 may be identical to a time length of the porch interval of the synchronization signal vsync1.

The frequency controller 133 may output the signal se0 based on the signals te0, vsync1, and vsync2. The frequency controller 133 may adjust a frequency of the signal se0 depending on the synchronization signal vsync2. A period of the signal se0 may correspond to a period in which a current is output from each pixel of FIG. 2.

The frequency controller 133 may adjust a width of a pulse of the signal se0 such that the pulse of the signal se0 is generated as much as the same count every period of the synchronization signal vsync2. In detail, in the case in which a frequency of the synchronization signal vsync2 is lower than a frequency of the synchronization signal vsync1, the frequency controller 133 may make a pulse width of the signal se0 wide. In the case in which a frequency of the synchronization signal vsync2 is identical to a frequency of the synchronization signal vsync1, the frequency controller 133 may make a pulse width of the signal se0 narrow.

The controller 115 may receive the signals vsync2 and se0. The controller 115 may output the signal sg0 based on the synchronization signal vsync2. Also, the controller 115 may output the signal sg1 based on the signal se0. The controller 115 may control the gate driver 140 based on the signals sg0 and sg1.

Figure 4:
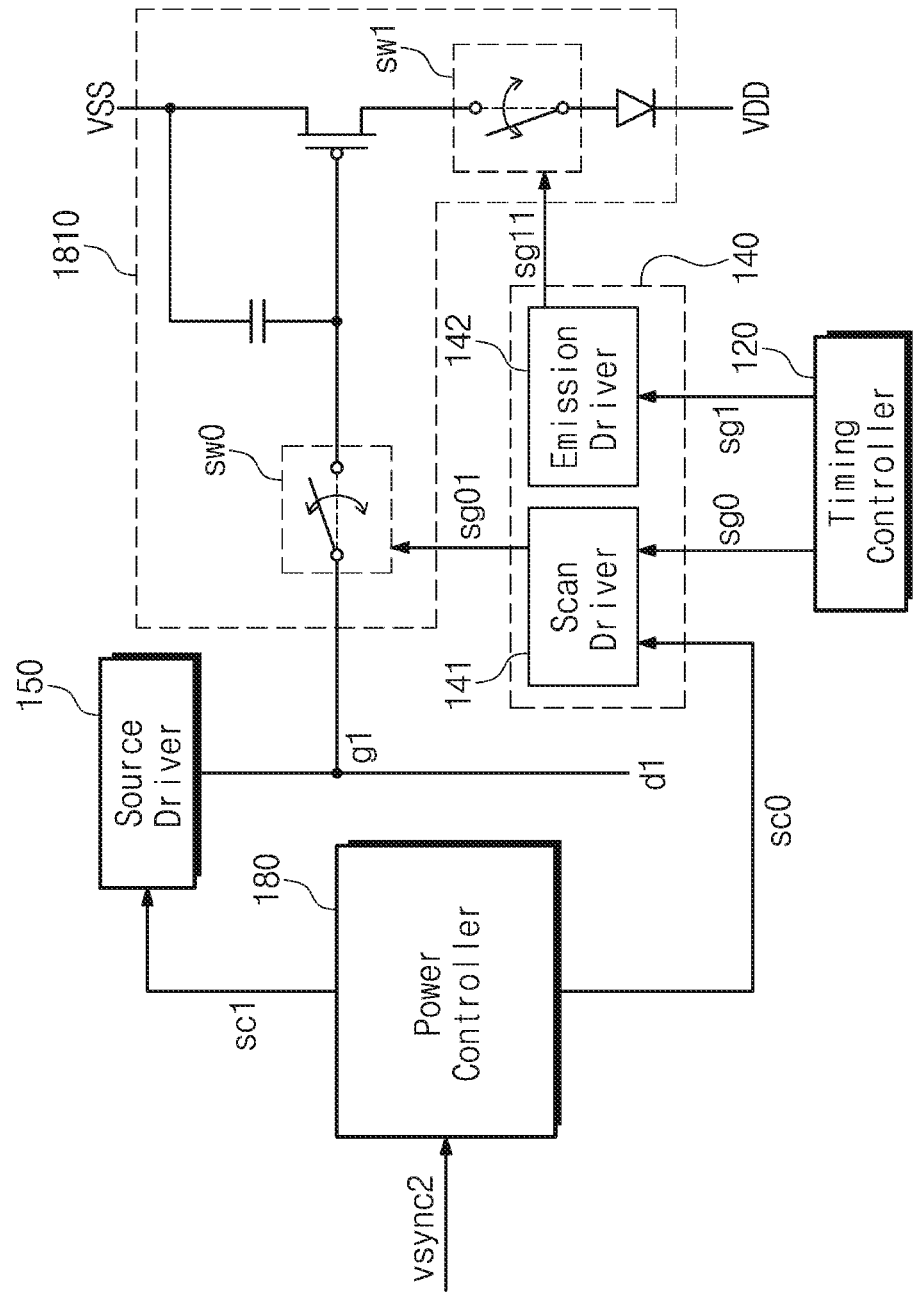
FIG. 4 is a block diagram for describing an operation of a power controller of FIG. 2.

FIG. 4 is a block diagram for describing an operation of the power controller 180 of FIG. 2.

The gate driver 140 may include a scan driver 141 and an emission driver 142.

The scan driver 141 may receive the signal sg0. The scan driver 141 may output a signal sg01 based on the signal sg0. The scan driver 141 may turn on or turn off a switch sw0 based on the signal sg01. The switch sw0 may be connected to a gate line g1. In the case in which the switch sw0 is turned on, the pixel 1810 may store charges input from the source driver 150. In the case in which the switch sw0 is turned off, a voltage may not be input from the source driver 150 to the pixel 1810.

The emission driver 142 may output a signal sg11 based on the signal sg1. The emission driver 142 may turn on or turn off a switch sw1 based on the signal sg11. In the case in which the switch sw1 is turned on, the pixel 1810 may output the stored charges. Accordingly, in the case in which the stored charges are output, a light of a pixel corresponding to the voltage input to the pixel 1810 may be emitted from the pixel 1810. In the case in which the switch sw0 is turned off, the pixel 1810 may not output the stored charges.

The power controller 180 may receive the synchronization signal vsync2. The power controller 180 may output signals sc0 and sc1 based on the synchronization signal vsync2. The power controller 180 may turn on or turn off the scan driver 141 by using the signal sc0. The power controller 180 may turn on or turn off the source driver 150 by using the signal sc1. To turn on the scan driver 141 and the source driver 150 means to supply a power to the scan driver 141 and the source driver 150. To turn off the scan driver 141 and the source driver 150 means to stop supplying a power to the scan driver 141 and the source driver 150.

When a frequency of the synchronization signal vsync2 is lower than a frequency of the synchronization signal vsync1, the power controller 180 may turn on the scan driver 141 and the source driver 150 in a display interval of the synchronization signal vsync2. When a frequency of the synchronization signal vsync2 is lower than a frequency of the synchronization signal vsync1, the power controller 180 may turn off the scan driver 141 and the source driver 150 in a porch interval of the synchronization signal vsync2.

However, the inventive concept is not limited thereto. For example, the power controller 180 may turn on the scan driver 141 and the source driver 150 in the display interval of the synchronization signal vsync2 regardless of the frequency of the synchronization signal vsync2. Also, the power controller 180 may turn off the scan driver 141 and the source driver 150 in the porch interval of the synchronization signal vsync2 regardless of the frequency of the synchronization signal vsync2.

According to an embodiment of the inventive concept, a porch interval of the synchronization signal vsync2 that is generated while a still image is displayed in the display panel 1800 may be longer than a porch interval of the synchronization signal vsync2 that is generated while a video is displayed in the display panel 1800. Accordingly, the power controller 180 may turn off the scan driver 141 and the source driver 150 during a longer time. According to an embodiment of the inventive concept, power consumption of the scan driver 141 and the source driver 150 may be markedly reduced.

Most (about 90%) of an analog power consumed in the display driver circuit 100 may be a power consumed in the source driver 150. Accordingly, the display driver circuit 100 may markedly reduce analog power consumption by turning off the source driver 150 in the porch interval.

Figure 5:
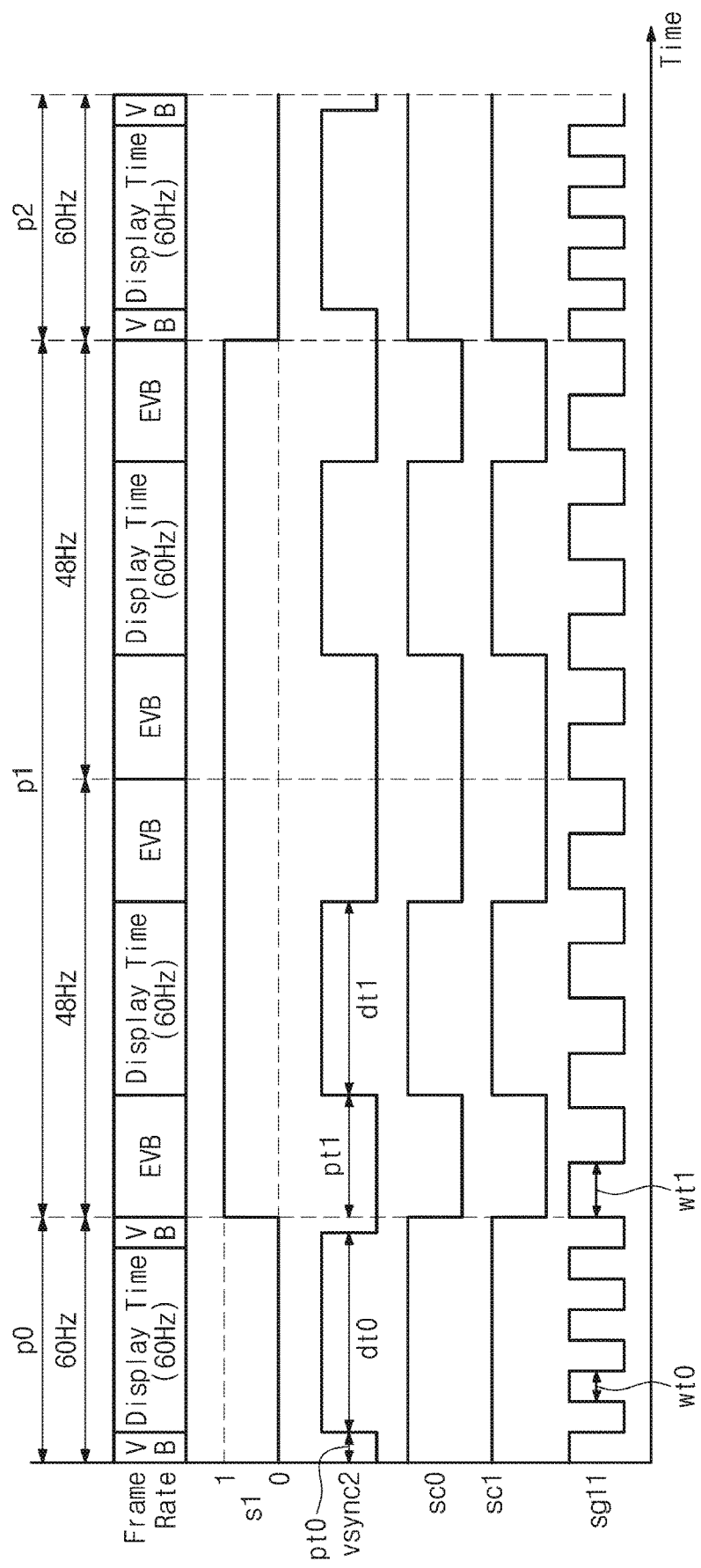
FIG. 5 is a timing diagram for describing an operation of the display driver circuit of FIG. 2.

FIG. 5 is a timing diagram for describing an operation of the display driver circuit 100 of FIG. 2. For better understanding, FIGS. 3 and 4 will be referenced together.

In a period p0, the number of times that image data are not input to the display driver circuit 100 may be smaller than a reference count. Accordingly, the comparator 132 may output the signal s1 having a value of logic "0." A frequency of the synchronization signal vsync2 may be identical to a frequency of the synchronization signal vsync1. A time length of a porch interval pt0 of the synchronization signal vsync2 may be identical to a time length of a porch interval of the synchronization signal vsync1. Also, a time length of a display interval dt0 of the synchronization signal vsync2 may be identical to a time length of a display interval of the synchronization signal vsync1.

In the period p0, a frame rate at which image data are output to the display panel 1800 may be in inverse proportion to a sum of the time length of the porch interval pt0 and the time length of the display interval dt0. For example, in the period p0, the frame rate may be 60 Hz.

In the period p0, the power controller 180 may output the signals sc0 and sc1 having a value of logic "1." In the period p0, the scan driver 141 and the source driver 150 may be turned on based on the signals sc0 and sc1.

In the period p0, the emission driver 142 may output the signal sg11 based on the signal sg1.

In a period p1, the number of times that image data are not input to the display driver circuit 100 may be greater than the reference count. Accordingly, the comparator 132 may output the signal s1 having a value of logic "1." A frequency of the synchronization signal vsync2 may be lower than a frequency of the synchronization signal vsync1. A time length of a porch interval pt1 of the synchronization signal vsync2 may be longer than a time length of a porch interval of the synchronization signal vsync1. That is, a time length of the porch interval pt1 of the synchronization signal vsync2 may be longer than a time length of the porch interval pt0 of the synchronization signal vsync2 in the period p0. A time length of a display interval dt1 of the synchronization signal vsync2 may be identical to a time length of a display interval of the synchronization signal vsync1. That is, a time length of the display interval dt1 of the synchronization signal vsync2 may be identical to a time length of the display interval dt0 of the synchronization signal vsync2 in the period p0.

In the period p1, a sum of the time length of the porch interval pt1 and the time length of the display interval dt1 may be longer than a sum of the time length of the porch interval pt0 and the time length of the display interval dt0. That is, a frame rate in the period p1 may be lower than the frame rate in the period p0. For example, in the period p1, the frame rate may be 48 Hz.

In the period p1, the power controller 180 may output the signals sc0 and sc1 depending on a logical value of the synchronization signal vsync2. The synchronization signal vsync2 may have a value of logic "1" in the display interval dt1. Accordingly, the power controller 180 may output the signals sc0 and sc1 having a value of logic "0" in the display interval dt1. The scan driver 141 and the source driver 150 may be turned on based on the signals sc0 and sc1 in the display interval dt1. The synchronization signal vsync2 may have a value of logic "0" in the porch interval pt1. Accordingly, the power controller 180 may output the signals sc0 and sc1 having a value of logic "0" in the porch interval pt1. The scan driver 141 and the source driver 150 may be turned off based on the signals sc0 and sc1 in the porch interval pt1.

According to an embodiment of the inventive concept, the display driver circuit 100 may make a frame rate of the period p1 low, thus overall reducing a power consumed in the display driver circuit 100. The display driver circuit 100 may turn off the scan driver 141 and the source driver 150 in the porch interval pt1, thus reducing an analog power consumed in the display driver circuit 100.

In the period p1, the emission driver 142 may adjust the signal sg11 based on the signal sg1. The signal sg11 may be adjusted to oscillate as much as the same count every period of the synchronization signal vsync2 in the period p0 and the period p1. For example, the signal sg11 may oscillate four times every period of the synchronization signal vsync2 in the period p0 and the period p1.

The number of times that the pixel 1810 emits a light may be determined according to the number of times that the signal sg11 oscillates every period of the synchronization signal vsync2. The quality of an image displayed in the display panel 1800 may be determined according to the number of times that the pixel 1810 emits a light every period of the synchronization signal vsync2. In detail, in the case in which the pixel 1810 emits a light four times every period of the synchronization signal vsync2, the quality of image may maintain an optimum value. Accordingly, the display driver circuit 100 according to an embodiment of the inventive concept may maintain the quality of image at an optimum value by maintaining the number of times that the pixel 1810 emits a light every period of the synchronization signal vsync2.

Accordingly, the emission driver 142 may adjust a width of a pulse of the signal sg11 such that the signal sg11 oscillates as much as the same count every period of the synchronization signal vsync2 in the period p0 and the period p1. The emission driver 142 may adjust the pulse width of the signal sg11 from "wt0" to "wt1."

In a period p2, the display driver circuit 100 may receive new image data. In the period p2, the comparator 132 may again output the signal s1 having a value of logic "0." Waveforms of the signals s1, vsync2, sc0, sc1, and sg11 in the period p2 may be identical to waveforms of the signals s1, vsync2, sc0, sc1, and sg11 in the period p0.

However, the inventive concept is not limited thereto. The display driver circuit 100 may adjust a frequency of the synchronization signal vsync2 to be higher than a frequency of the synchronization signal vsync2 in the period p1. In the following descriptions, for convenience of description, it is assumed that the synchronization signal vsync2 in the period p2 has a frequency of the synchronization signal vsync2 in the period p0.

Figure 6:
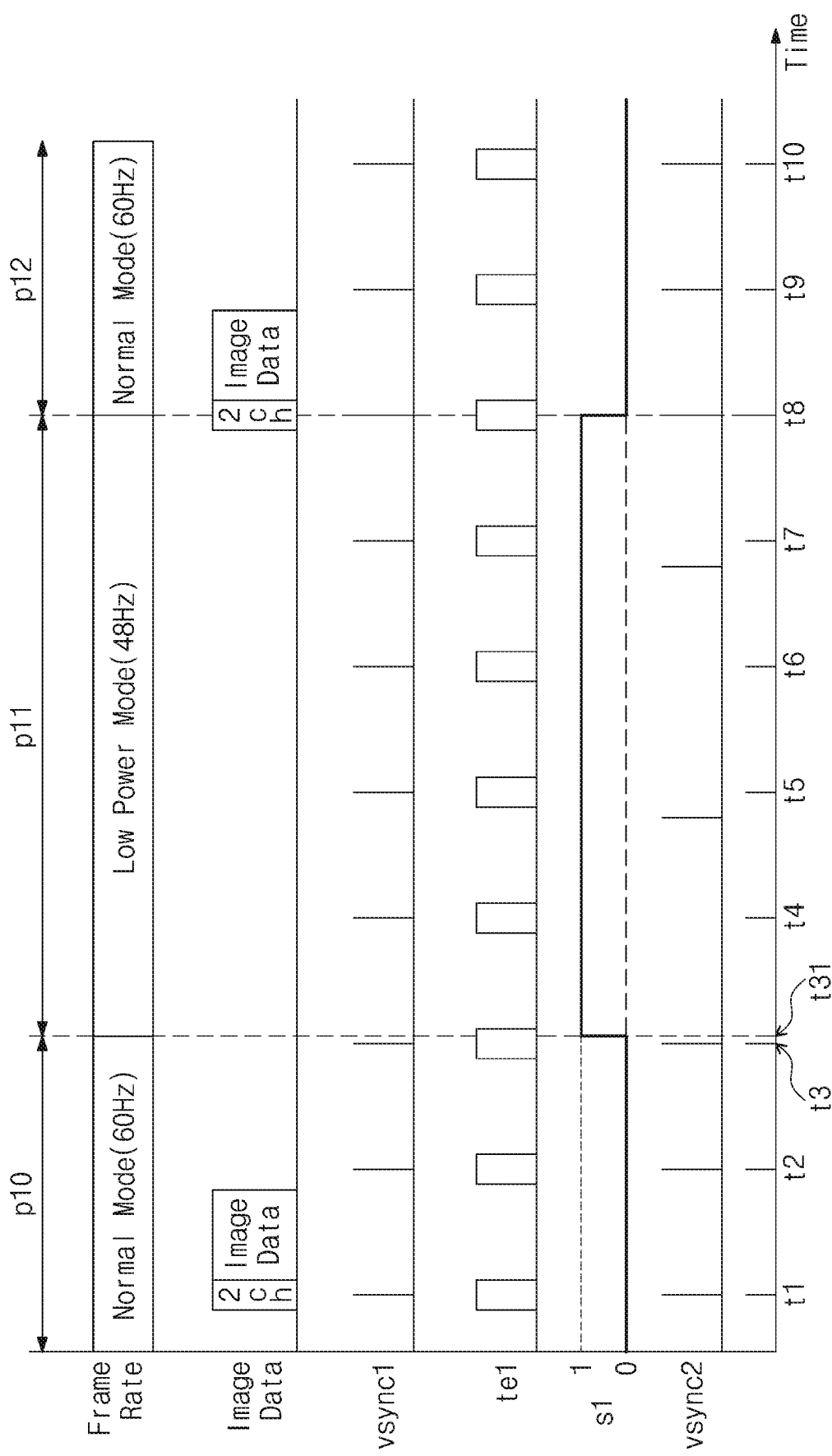
FIG. 6 is a timing diagram for describing an operation of the display driver circuit of FIG. 2.

FIG. 6 is a timing diagram for describing an operation of the display driver circuit 100 of FIG. 2.

The signals s1, vsync2, sc0, sc1, and sg11 exchanged between components of the display driver circuit 100 are described with reference to FIG. 5. A method of adjusting a frequency of the synchronization signal vsync2 is described with reference to FIG. 5. Below, the signals te1 and vsync1 and image data exchanged between the main processor 1700 and the display driver circuit 100 will be described with reference to FIG. 6.

As described with reference to FIG. 2, the display driver circuit 100 may output the signal te1. The main processor 1700 may output the signal vsync1 and image data in response to the signal te1. The main processor 1700 may output data 2ch together with image data. That the data 2ch are not output means that image data are not output. In the following descriptions, it is assumed that image data include the data 2ch.

The frame counter 131 may receive the signal vsync1 and image data. The frame counter 131 may recognize the data 2ch. The frame counter 131 may determine whether the data 2ch are received and may count the number of times that image data are not received. Also, the frame counter 131 may analyze the data 2ch and/or the image data and may determine whether pieces of image data continuously received are identical to each other. The frame counter 131 may count the number of times that the same image data are received, based on a result of the determination. The main processor 1700 may output the same image data and then may output only the signal vsync1 without image data. In this case, the frame counter 131 may count both the number of times that the same image data are received, and the number of times that image data are not received.

The comparator 132 may compare the counted number of times and a reference count. A description will be given with reference to FIG. 6 under assumption that the reference count is "2." When the counted number of times is not smaller than the reference count, the comparator 132 may output the signal s1 having a value of logic "1."

A period p10 may include the p0 of FIG. 5. The period p10 may be a period until the comparator 132 outputs the signal s1 having a value of logic "1." At a time point "t1," image data and the synchronization signal vsync1 corresponding to the signal te1 may be received. In this case, the number of times counted in the frame counter 131 may be "0." In the case in which the counted number of times is smaller than "2," the comparator 132 may output the signal s1 having a value of logic "0."

At a time point "t2," the synchronization signal vsync1 corresponding to the signal te1 may be received without the image data. In this case, the number of times counted in the frame counter 131 may be "1." In the case in which the counted number of times is smaller than "2," the comparator 132 may output the signal s1 having a value of logic "0."

At a time point "t3," the synchronization signal vsync1 corresponding to the signal te1 may be received without the image data. In this case, the number of times counted in the frame counter 131 may be "2."

In the case in which the counted number of times is not smaller than "2," the comparator 132 may output the signal s1 having a value of logic "1."

A period p11 may include the p1 of FIG. 5. The period p11 may be a period in which the comparator 132 outputs the signal s1 having a value of logic "1." In the period p11, the frequency adjusting circuit 130 may make a frequency of the synchronization signal vsync2 low. As described with reference to FIG. 5, a time length of a display interval of the synchronization signal vsync2 in the period p11 may be identical to a time length of a display interval of the synchronization signal vsync2 in the period p10. A time length of a porch interval of the synchronization signal vsync2 in the period p11 may be longer than a time length of a porch interval of the synchronization signal vsync2 in the period p10.

In the period p11, the display driver circuit 100 may maintain a frequency of the signal te1 to be identical to a frequency of the signal te1 in the period p10. Accordingly, in the case in which a situation in which a new image may be output to the display panel 1800 occurs, the display panel 1800 may receive image data more quickly. This will be described with reference to FIGS. 8 to 11.

A period p12 may include the p2 of FIG. 5. At a time point "t8," image data and the synchronization signal vsync1 corresponding to the signal te1 may be received. Accordingly, as described with reference to FIG. 5, the comparator 132 may again output the signal s1 having a value of logic "0." The period p12 may be a period in which the comparator 132 again outputs the signal s1 having a value of logic "0." In the period p12, the frequency adjusting circuit 130 may make a frequency of the synchronization signal vsync2 higher.

Figure 7:
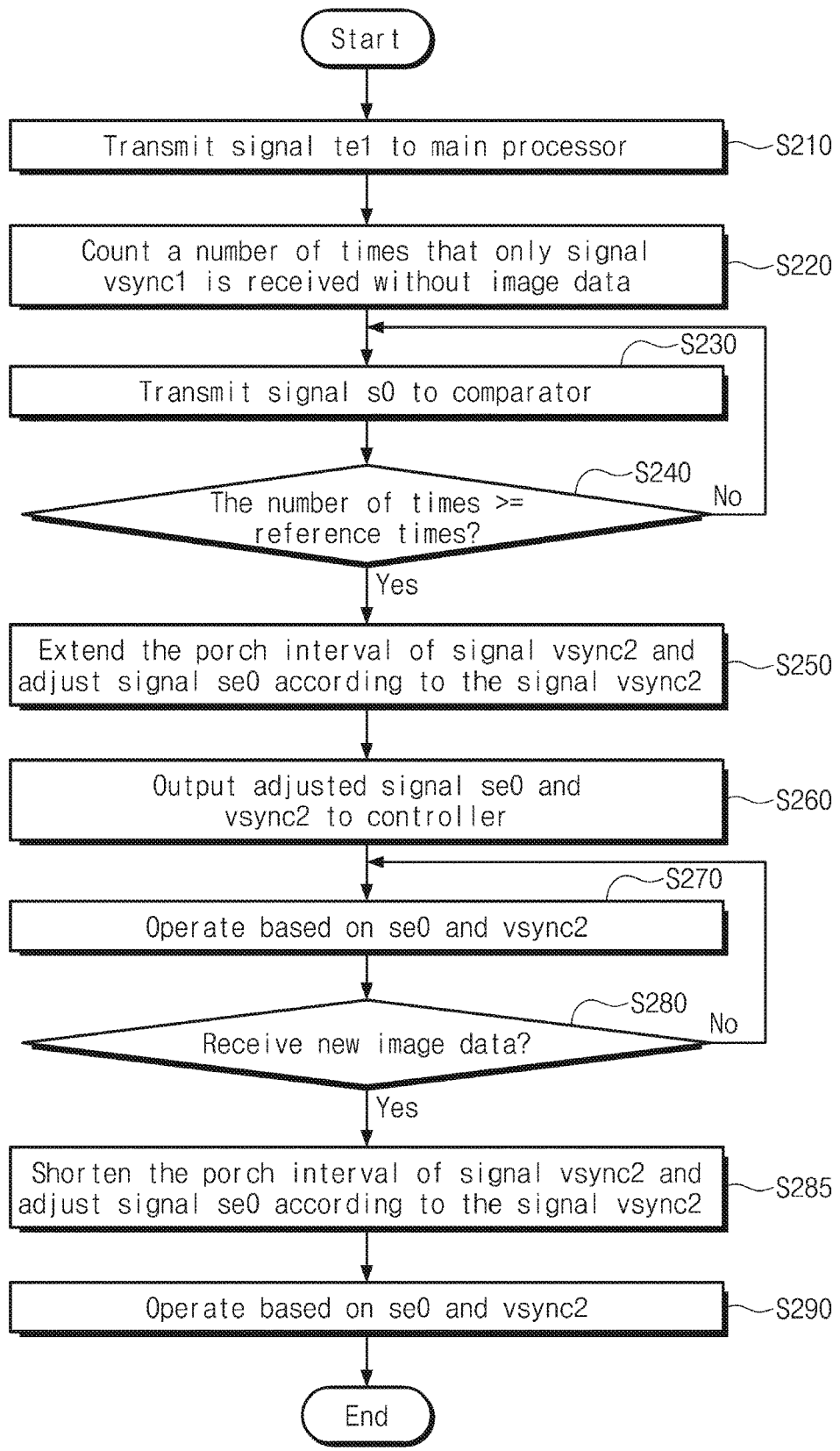
FIG. 7 is a flowchart for describing an operation of the display driver circuit of FIG. 2.

FIG. 7 is a flowchart for describing an operation of the display driver circuit 100 of FIG. 2. For better understanding, FIGS. 2 and 3 will be referenced together.

In operation S210, the display driver circuit 100 may output the signal te1 to the main processor 1700. In the case in which the display panel 1800 displays a video, the main processor 1700 may output image data and the synchronization signal vsync1 in response to the signal te1. In the case in which the display panel 1800 displays a still image, the main processor 1700 may output the synchronization signal vsync1 without image data in response to the signal te1.

In operation S220, the frame counter 131 may count the number of times that only the synchronization signal vsync1 is received without image data.

In operation S230, the frame counter 131 may output the signal s0 to the comparator 132. The signal s0 may include information about the counted number of times.

In operation S240, the comparator 132 may compare the counted number of times and reference times or a reference count.

In the case in which the counted number of times is not smaller than the reference count, in operation S250, the frequency controller 133 may extend a porch interval of the synchronization signal vsync2. Also, the frequency controller 133 may adjust the signal se0 depending on a frequency of the synchronization signal vsync2. In detail, the frequency controller 133 may extend a pulse width of the signal se0.

In operation S260, the frequency adjusting circuit 130 may output the adjusted synchronization signal vsync2 and the adjusted signal se0 to the controller 115.

In the case in which the counted number of times is smaller than the reference count, the display driver circuit 100 may repeatedly perform operation S230 and operation S240 until the counted number of times becomes not smaller than the reference count.

In operation S270, the display driver circuit 100 may operate based on the signals vsync2 and se0. Operation S270 is substantially identical to an operation of the display driver circuit 100 in the period p1 of FIG. 5 and the period p11 of FIG. 6, and thus, additional description will be omitted to avoid redundancy.

In operation S280, the frame counter 131 may determine whether new image data are received.

In the case in which the new image data are received, in operation S285, the frequency controller 133 may shorten or decrease a porch interval of the synchronization signal vsync2. Also, the frequency controller 133 may adjust the signal se0 according to a frequency of the synchronization signal vsync2. In detail, the frequency controller 133 may make a pulse width of the signal se0 small.

In the case in which new image data are not received, the display driver circuit 100 may repeatedly perform operation S270 and operation S280 until new image data are received.

In operation S290, the frequency controller 133 may output the synchronization signal vsync2 and the signal se0. The display driver circuit 100 may operate based on the signals vsync2 and se0.

Figure 8:
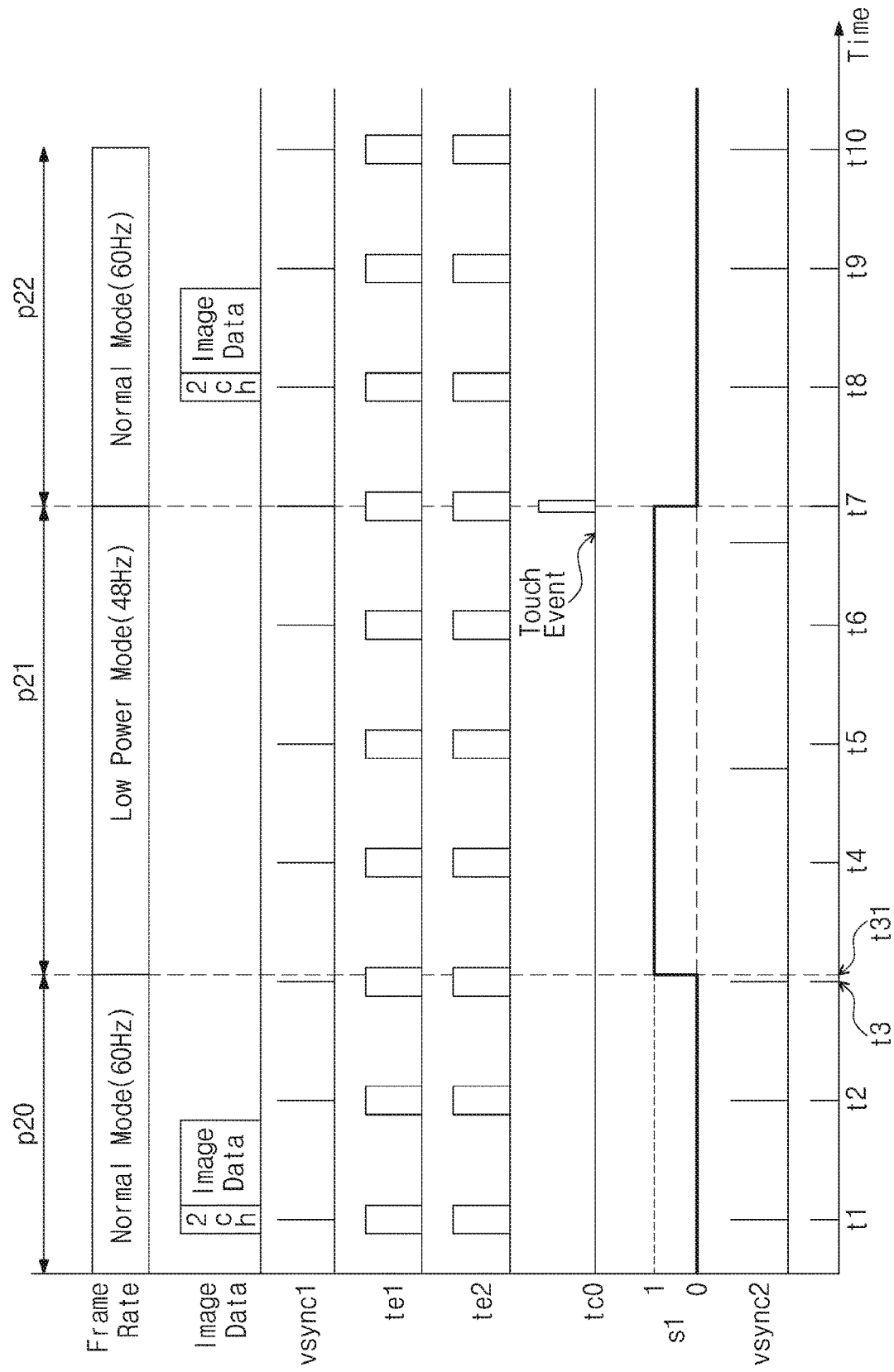
FIG. 8 is a timing diagram for describing an operation of the display driver circuit of FIG. 2.

FIG. 8 is a timing diagram for describing an operation of the display driver circuit 100 of FIG. 2. For better understanding, FIGS. 2, 3, and 6 will be referenced together.

An operation of the display driver circuit 100 to be described with reference to FIG. 8 may be similar to the operation of the display driver circuit 100 described with reference to FIG. 6. However, the display driver circuit 100 to be described with reference to FIG. 8 may shorten a porch interval of the synchronization signal vsync2 to an original porch interval when the signal tc0 is received. Accordingly, a difference between the timing diagram of FIG. 8 and the timing diagram of FIG. 6 may be focused, and thus, additional description will be omitted to avoid redundancy.

An operation of the display driver circuit 100 in a period p20 may be substantially identical to the operation of the display driver circuit 100 in the period p10 of FIG. 6.

An operation of the display driver circuit 100 until a touch event occurs in a period p21 may be substantially identical to the operation of the display driver circuit 100 in the period p11 of FIG. 6.

Between a time point "t6" and a time point "t7," a touch event may occur. In the following descriptions, the touch event may mean that the user touches a touch panel. In the case of intending to convert an image to be displayed in the display panel 1800, the user may touch the touch panel. However, the inventive concept is not limited thereto. For example, the touch event may be an operation occurring before an image to be displayed in the display panel 1800 is converted. As described with reference to FIG. 2, the touch circuit 1900 may recognize that the touch event occurs. The display driver circuit 100 may output the signal te2 to the touch circuit 1900. The signal te2 may be a periodic signal.

In the case in which the signal te2 is received after the touch event occurs, at a time point "t7," the touch circuit 1900 may output the signal tc0. The touch circuit 1900 may output the signal tc0 in response to the signal te2. In the period p21, the display driver circuit 100 may maintain a frequency of the signal te2 to be identical to a frequency of the signal te2 in the period p20. Accordingly, the display driver circuit 100 according to an embodiment of the inventive concept may recognize that the touch event occurs, more quickly. The case in which the display driver circuit 100 recognizes the occurrence of the touch event later will be described with reference to FIG. 9.

As described with reference to FIG. 3, in the case in which the signal tc0 is input to the frame counter 131, the comparator 132 may output the signal s1 having a value of logic "0." The frequency controller 133 may increase a frequency of the synchronization signal vsync2 to an original frequency based on the signal s1.

In the case in which a touch event occurs, the main processor 1700 may recognize that the touch event occurs, through communication with the touch circuit 1900. However, the inventive concept is not limited thereto. For example, the main processor 1700 may recognize that a touch event occurs, through communication with the display driver circuit 100. In the case of recognizing that a touch event occurs, the main processor 1700 may output new image data. Accordingly, at a time point "t8," the main processor 1700 may output new image data in response to the signal te1.

In the period p21, the display driver circuit 100 may maintain a frequency of the signal te1 to be identical to a frequency of the signal te1 in the period p20. Accordingly, in the case in which a touch event occurs, the display driver circuit 100 may receive new image data more quickly. The case in which the display driver circuit 100 receives new image data later will be described with reference to FIG. 9.

As described above, the frequency controller 133 may receive the signal tc0 before new image data are received. In the case in which the signal tc0 is received, the frequency controller 133 may increase a frequency of the synchronization signal vsync2 to an original frequency before new image data are received. That is, even in the case in which a separate command is not received, the display driver circuit 100 according to an embodiment of the inventive concept may adjust a frequency of the synchronization signal vsync2 at a time when image data are received.

Figure 9:
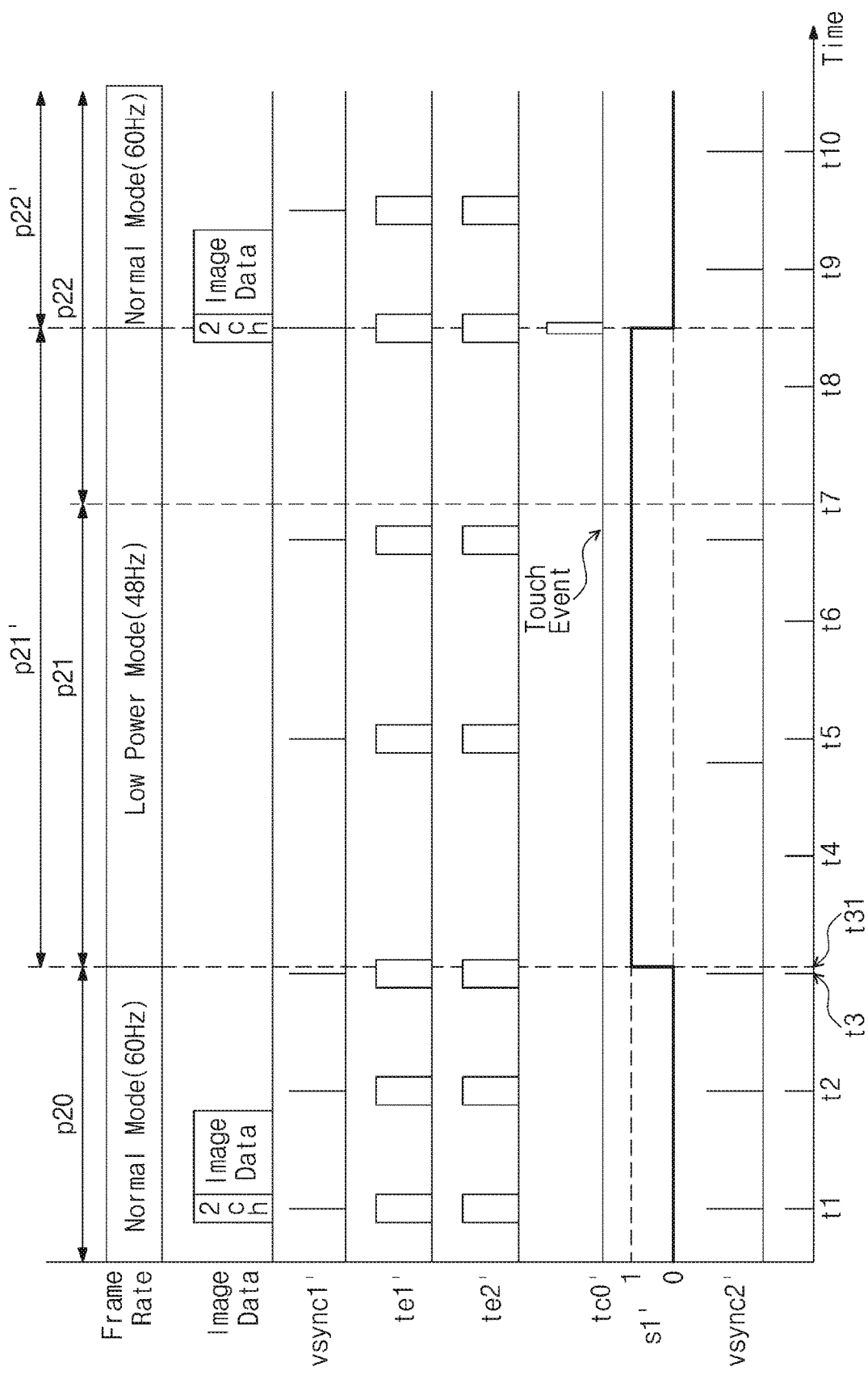
FIG. 9 is a timing diagram for describing an operation of a display driver circuit.

FIG. 9 is a timing diagram for describing an operation of a display driver circuit.

Unlike FIG. 8 in which the case in which a frequency of the signals te1 and te2 is maintained constant regardless of a frequency of the synchronization signal vsync2 is illustrated, the case in which frequencies of the signals te1' and te2' are changed as a frequency of a signal vsync2' is changed is illustrated in FIG. 9. Below, a difference between FIGS. 8 and 9 may be focused, and thus, additional description will be omitted to avoid redundancy.

For bettering understanding, a description will be given with reference to FIG. 9 under assumption that a frequency of the signal vsync2' is maintained at 60 Hz in the period p20 and a period p22'. Also, it is assumed that a frequency of the signal vsync2' is maintained at 48 Hz in a period p21'.

In the period p21', a frequency of the signal vsync2' may be changed to 48 Hz. As the frequency of the signal vsync2' is changed, a frequency of signals te1' and te2' may also be changed to 48 Hz. However, the frequency of the signal te1' and te2' may not be identical to the frequency of the signal vsync2'. It may be sufficient only that the frequency of the signals te1' and te2' in the period p21' is lower than the frequency of the signals te1' and te2' in the period p20.

As described with reference to FIG. 8, between the time point "t6" and the time point "t7," a touch event may occur. However, unlike the description given with reference to FIG. 8, the signal te2' may be output to be later than the time point "t7." The display driver circuit 100 may receive a signal tc0' to be later than the time point "t7." Accordingly, unlike the description given with reference to FIG. 8, the display driver circuit 100 may fail to increase a frequency of the signal vsync2' to an original frequency before new image data are received, or may increase a frequency of the signal vsync2' more sharply than the description given with reference to FIG. 8.

Also, unlike the description given with reference to FIG. 8, the signal te1' may be output to be later than the time point "t8." Accordingly, new image data may be input to the display driver circuit 100 to be later than the description given with reference to FIG. 8.

That is, referring to FIGS. 8 and 9, the display driver circuit 100 according to an embodiment of the inventive concept may shorten a delay time by maintaining a frequency of the signals te1 and te2 in the period p21 to be identical to a frequency of the signals te1 and te2 in the period p20. The delay time may mean a time length from when a touch even occurs to when an image of the display panel 1800 is converted in response to the touch event.

Figure 10:
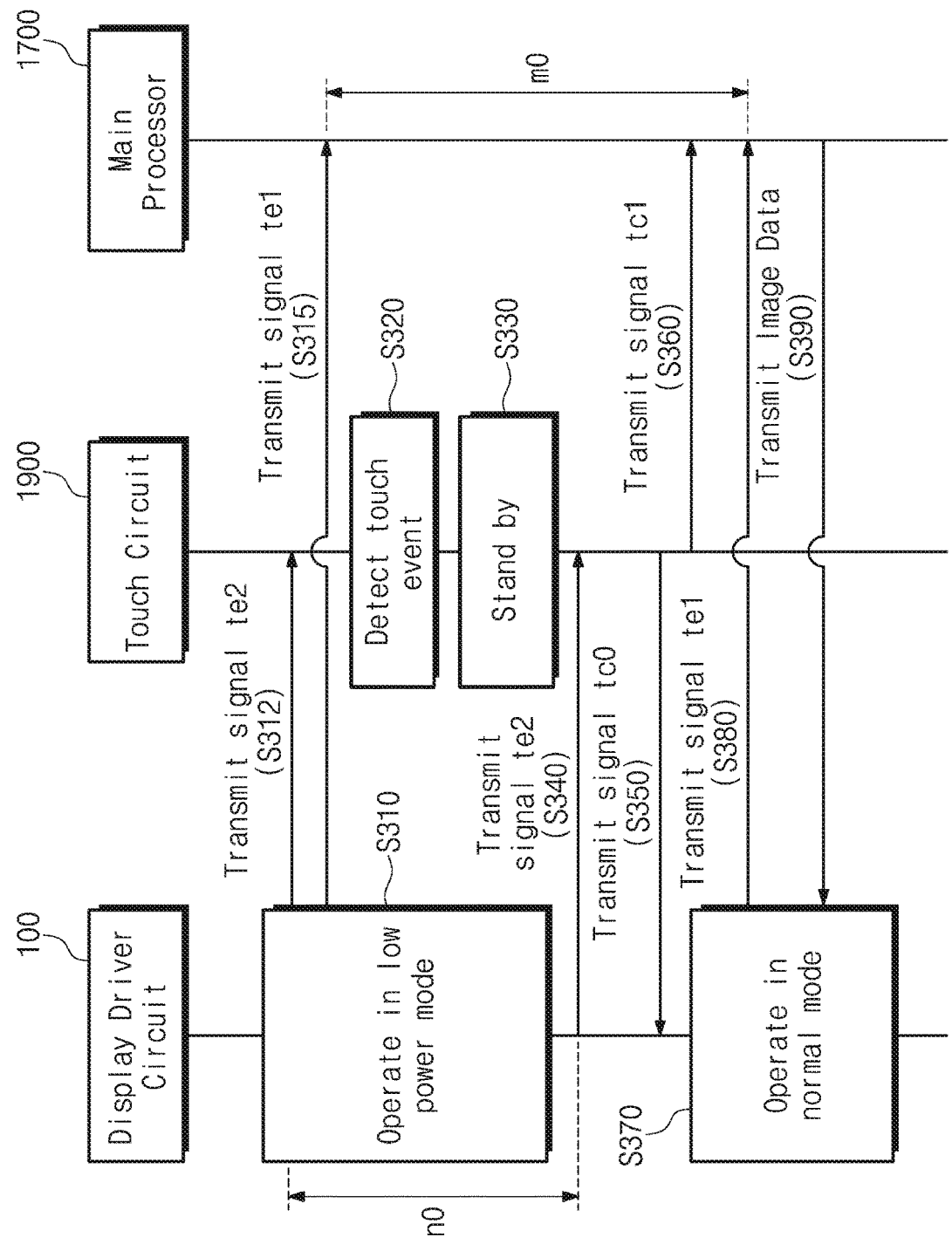
FIG. 10 is a flowchart for describing an operation of the display driver circuit described with reference to FIG. 8.

FIG. 10 is a flowchart for describing an operation of the display driver circuit 100 described with reference to FIG. 8.

In the following descriptions, operation S310 to operation S360 may indicate an operation that is performed in the period p21. Also, operation S370 to operation S390 may indicate an operation that is performed in the period p22.

In operation S310, the display driver circuit 100 may operate in a low power mode. A frequency of the synchronization signal vsync2 in the low power mode may be lower than a frequency of the synchronization signal vsync2 in a normal mode.

In operation S312, the display driver circuit 100 may transmit the signal te2 to the touch circuit 1900.

In operation S315, the display driver circuit 100 may transmit the signal te1 to the main processor 1700.

In operation S320, a touch event may occur at a touch panel. The touch circuit 1900 may detect or recognize that the touch event occurs.

In operation S330, the touch circuit 1900 may stand by until a new signal te2 is received after the touch event occurs.

In operation S340, the display driver circuit 100 may transmit the signal te2 to the touch circuit 1900. A time period n0 may be a period in which the signal te2 is output. A period of the signal te2 may be identical to a period of the signal te2 in the normal mode.

In operation S350, the touch circuit 1900 may transmit the signal tc0 to the display driver circuit 100 in response to the signal te2.

In operation S360, the touch circuit 1900 may transmit the signal tc1 to the main processor 1700. The signal tc1 may include information indicating that the touch event occurs. The main processor 1700 may prepare new image data to be output to the display driver circuit 100, based on the signal tc1.

In operation S370, the display driver circuit 100 may operate in the normal mode in response to the signal tc0.

In operation S380, the display driver circuit 100 may transmit the signal te1 to the main processor 1700. A time period m0 may be a period in which the signal te1 is output. A period of the signal te1 may be identical to a period of the signal te1 in the normal mode.

In operation S390, the main processor 1700 may transmit new image data to the display driver circuit 100 in response to the signal te1. That is, the display driver circuit 100 may receive new image data while operating in the normal mode.

Figure 11:
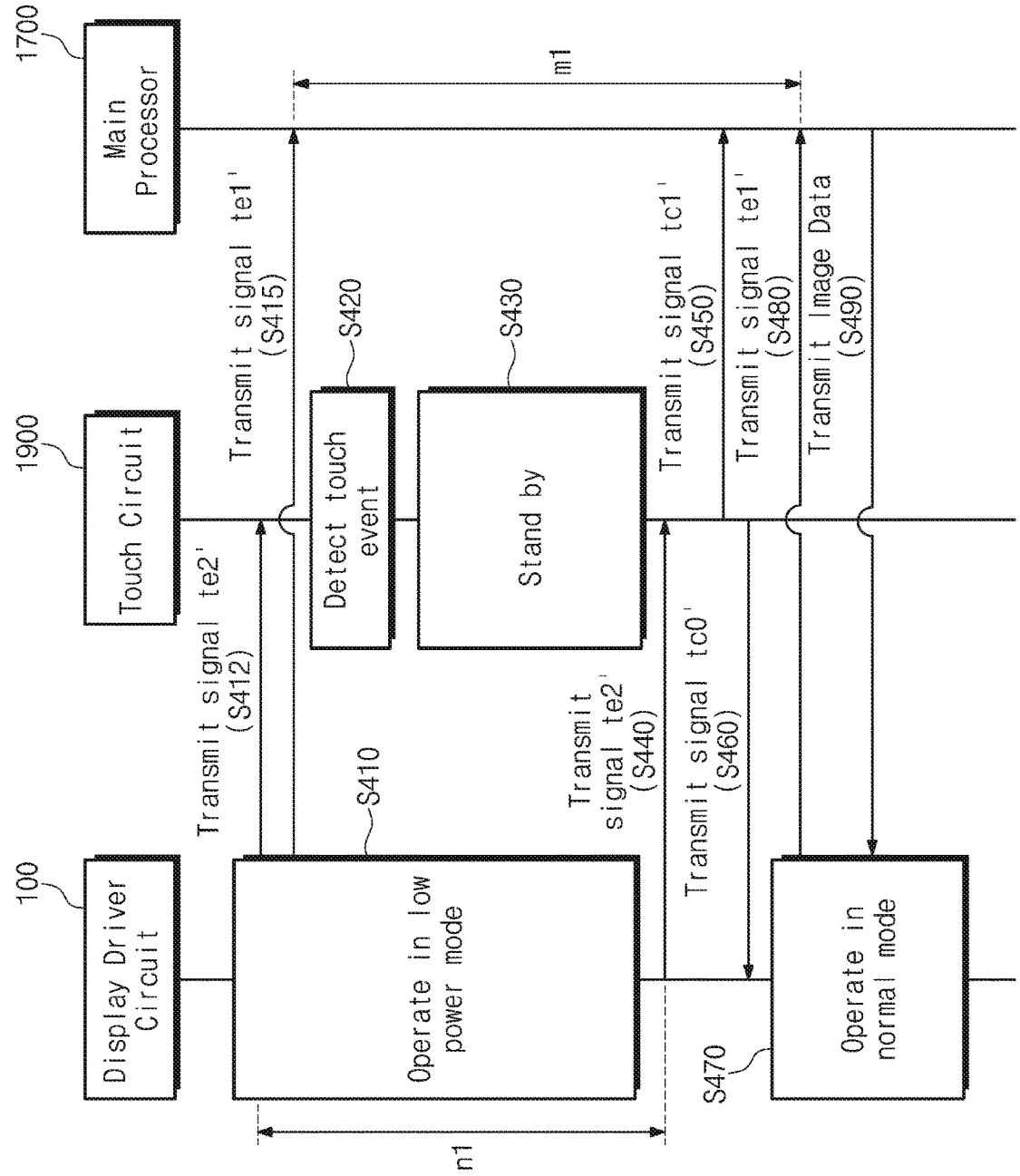
FIG. 11 is a flowchart for describing an operation of the display driver circuit described with reference to FIG. 9.

FIG. 11 is a flowchart for describing an operation of the display driver circuit described with reference to FIG. 9.

In the following descriptions, operation S410 to operation S460 may indicate an operation that is performed in the period p21'. Also, operation S470 to operation S490 may indicate an operation that is performed in the period p22'.

In operation S410, the display driver circuit 100 may operate in a low power mode. A frequency of the synchronization signal vsync2 in the low power mode may be lower than a frequency of the synchronization signal vsync2 in a normal mode.

In operation S412, the display driver circuit 100 may transmit the signal te2' to the touch circuit 1900.

In operation S415, the display driver circuit 100 may transmit the signal te1' to the main processor 1700.

In operation S420, a touch event may occur at a touch panel. The touch circuit 1900 may detect or recognize that the touch event occurs.

In operation S430, the touch circuit 1900 may stand by until a new signal te2' is received after the touch event occurs.

In operation S440, the display driver circuit 100 may transmit the signal te2' to the touch circuit 1900. A time period n1 may be a period in which the signal te2' is output. A frequency of the signal te2' may be lower than a frequency of the signal te2 of FIG. 10. Accordingly, the time period n1 may be longer than the time period n0 of FIG. 10.

In operation S450, the touch circuit 1900 may transmit the signal tc1' to the main processor 1700. The signal tc1' may include information indicating that the touch event occurs. The main processor 1700 may prepare new image data to be output to the display driver circuit 100, based on the signal tc1'.

In operation S460, the touch circuit 1900 may transmit the signal tc0' to the display driver circuit 100 in response to the signal te2'.

In operation S470, the display driver circuit 100 may operate in the normal mode in response to the signal tc0'.

In operation S480, the display driver circuit 100 may transmit the signal te1' to the main processor 1700. A time period m1 may be a period in which the signal te1' is output. A frequency of the signal te1' may be lower than a frequency of the signal te1 of FIG. 10. Accordingly, the time period m1 may be longer than the time period m1 of FIG. 10.

In operation S490, the main processor 1700 may transmit new image data to the display driver circuit 100 in response to the signal te1'.

Referring to FIGS. 10 and 11, the display driver circuit 100 may feedback a touch event of the user more quickly in operation S390 of FIG. 10.

Figure 12:
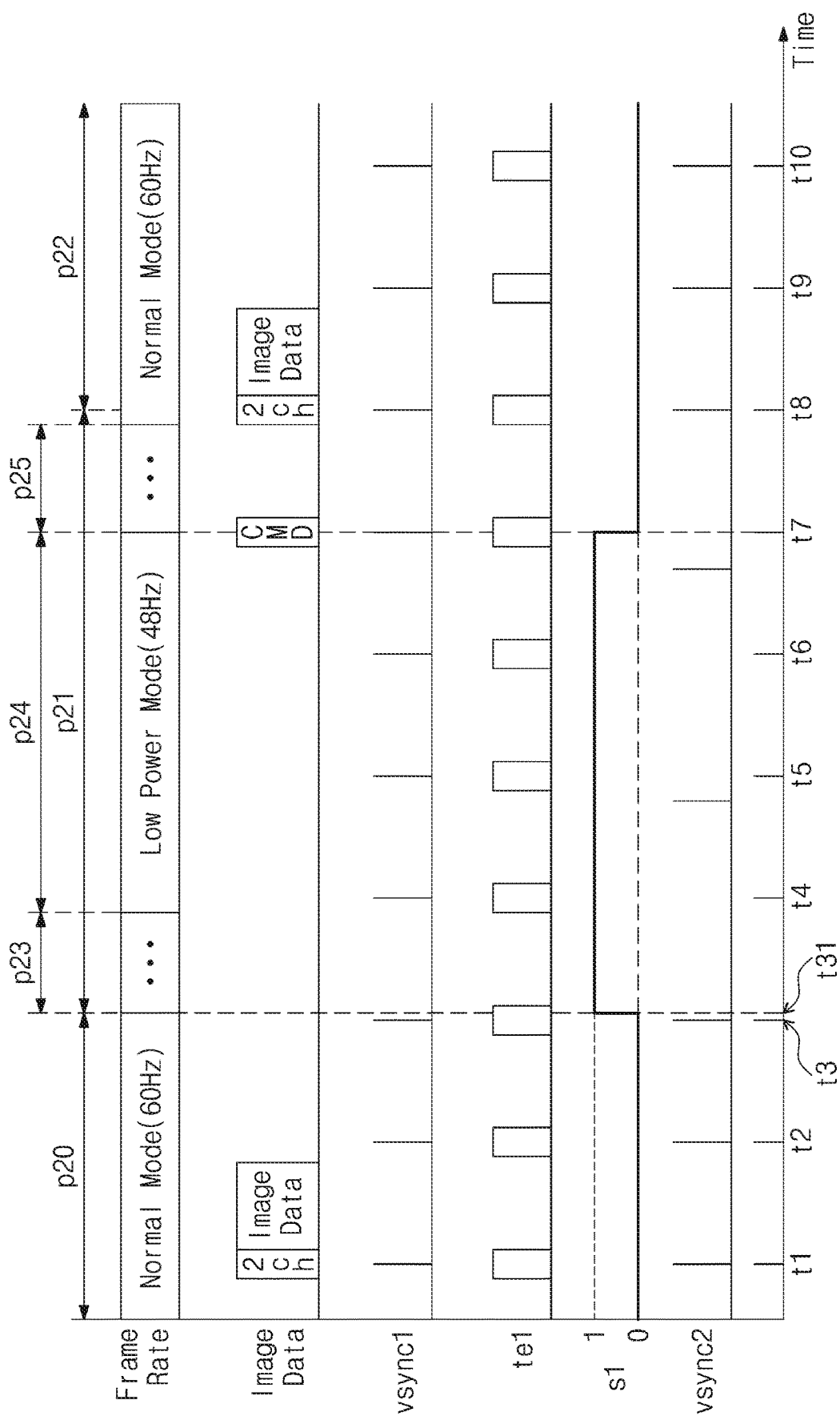
FIG. 12 is a timing diagram for describing an operation of the display driver circuit of FIG. 2.

FIG. 12 is a timing diagram for describing an operation of the display driver circuit 100 of FIG. 2.

An operation of the display driver circuit 100 to be described with reference to FIG. 12 is similar to the operation of the display driver circuit 100 described with reference to FIG. 8. However, the display driver circuit 100 to be described with reference to FIG. 12 may shorten a porch interval of the synchronization signal vsync2 to an original porch interval in response to an instruction or command (CMD) received from the main processor 1700. Accordingly, a difference between the timing diagram of FIG. 12 and the timing diagram of FIG. 8 may be focused, and thus, additional description will be omitted to avoid redundancy.

An operation of the display driver circuit 100 in the period p20 may be substantially identical to the operation of the display driver circuit 100 in the period p20 of FIG. 8.

At a time point "t31," a logical value of the signal s1 may be changed from "0" to "1." In this case, the synchronization signal vsync2 may be adjusted to a low frequency (e.g., 48 Hz) from a high frequency (e.g., 60 Hz) through a period p23.

The display driver circuit 100 described with reference to FIG. 8 may change a frequency of the synchronization signal vsync2 once. Alternatively, the display driver circuit 100 described with reference to FIG. 8 may change a frequency of the synchronization signal vsync2 in a shorter time. In contrast, the display driver circuit 100 described with reference to FIG. 12 may slowly change a frequency of the synchronization signal vsync2 during the period p23. For example, the display driver circuit 100 may extend a porch interval of the synchronization signal vsync2 during the period p23 stepwise by a given interval. For another example, the display driver circuit 100 may linearly extend a porch interval of the synchronization signal vsync2 during the period p23. For another example, the display driver circuit 100 may non-linearly extend a porch interval of the synchronization signal vsync2 during the period p23.

In a period p24, the display driver circuit 100 may output the synchronization signal vsync2 having a lower frequency.

At the time point "t7," the main processor 1700 may output an instruction in response to the signal te1. The main processor 1700 may first output an instruction before outputting new image data. The display driver circuit 100 may receive the instruction. In the case in which the instruction is received, the comparator 132 may output the signal s1 having a value of logic "0." In this case, the synchronization signal vsync2 may be adjusted to a high frequency (e.g., 60 Hz) from a low frequency (e.g., 48 Hz) through a period p25.

The display driver circuit 100 may slowly change a frequency of the synchronization signal vsync2 during the period p25. For example, the display driver circuit 100 may shorten a porch interval of the synchronization signal vsync2 during the period p25 stepwise by a given interval. For another example, the display driver circuit 100 may linearly shorten a porch interval of the synchronization signal vsync2 during the period p25. For another example, the display driver circuit 100 may non-linearly shorten a porch interval of the synchronization signal vsync2 during the period p25.

In the case in which the main processor 1700 outputs an instruction during a first time interval before new image data is output, the period p25 may be not greater than the first time interval. That is, the display driver circuit 100 may increase a frequency of the synchronization signal vsync2 to an original frequency before new image data are received. Alternatively, the display driver circuit 100 may increase a frequency of the synchronization signal vsync2 to an original frequency at a time point "t8" when new image data are received. Also, according to an embodiment of the inventive concept, because a frequency of the synchronization signal vsync2 is slowly changed, the user may not perceive a change in the frame rate.

Figure 13:
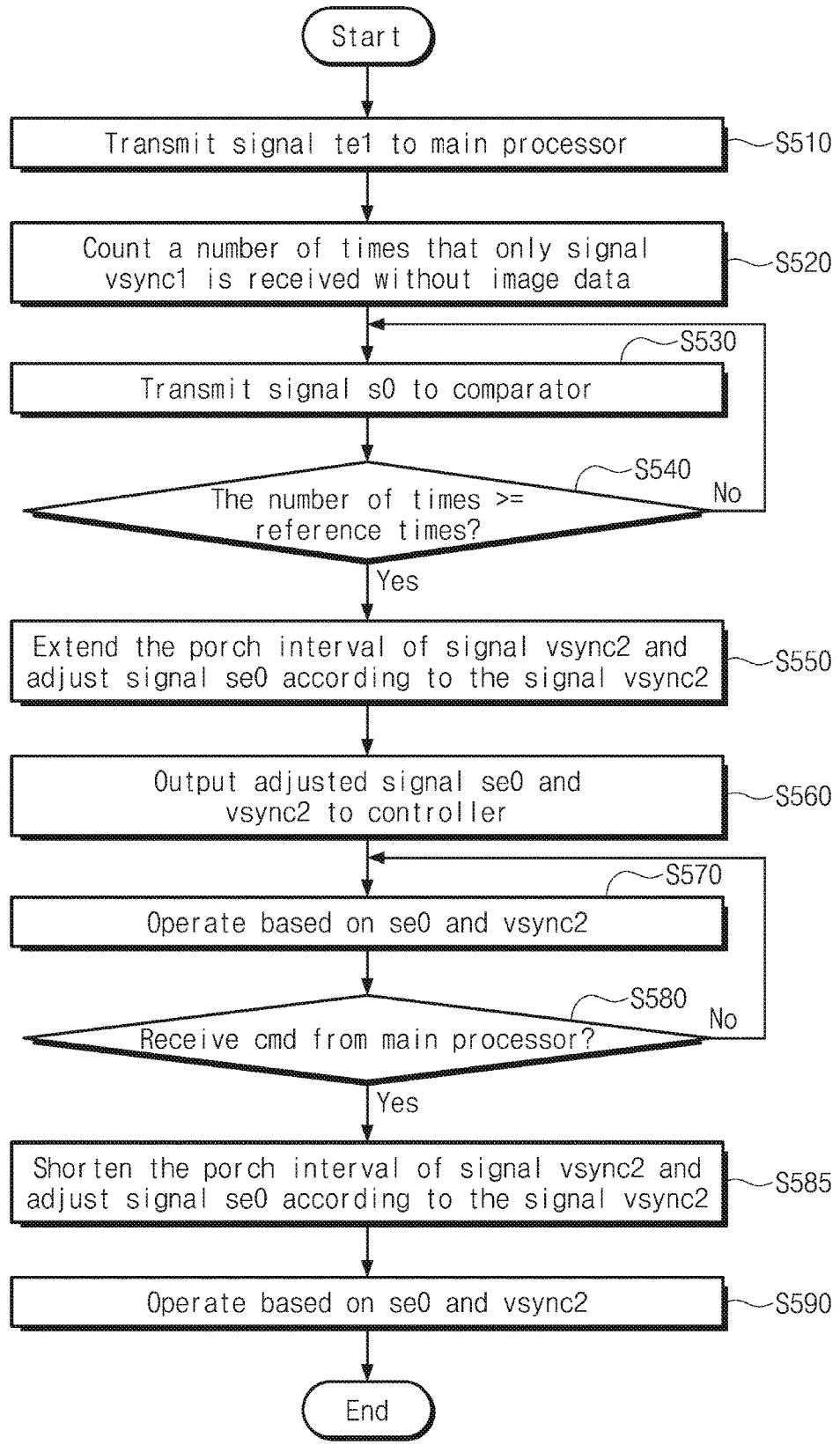
FIG. 13 is a flowchart for describing an operation of the display driver circuit described with reference to FIG. 12.

FIG. 13 is a flowchart for describing an operation of the display driver circuit 100 described with reference to FIG. 12.

Operation S510 to operation S570, operation S585, and operation S590 illustrated in FIG. 13 are similar to operation S210 to operation S270, operation S285, and operation S290 illustrated in FIG. 7. Accordingly, a difference between operation S510 to operation S590 and operation S210 and operation S290 is focused, and thus, additional description will be omitted to avoid redundancy.

In the case in which the counted number of times is not smaller than the reference count, in operation S550, the frequency controller 133 may extend a porch interval of the synchronization signal vsync2. However, unlike operation S250 of FIG. 7, the frequency controller 133 may slowly extend the porch interval of the synchronization signal vsync2. Also, the frequency controller 133 may slowly increase a pulse width of the signal se0. For example, the frequency controller 133 may increase a pulse width of the signal se0 during the period p23 stepwise by a given interval. For another example, the frequency controller 133 may linearly increase a pulse width of the signal se0 during the period p23. For another example, the frequency controller 133 may non-linearly increase a pulse width of the signal se0 during the period p23.

In operation S580, the frame counter 131 may determine whether an instruction or command (cmd) is received.

In the case in which the instruction is received, in operation S585, the frequency controller 133 may shorten the porch interval of the synchronization signal vsync2. However, unlike operation S285 of FIG. 7, the frequency controller 133 may slowly shorten the porch interval of the synchronization signal vsync2. Also, the frequency controller 133 may slowly decrease a pulse width of the signal se0. For example, the frequency controller 133 may decrease a pulse width of the signal se0 during the period p23 stepwise by a given interval. For another example, the frequency controller 133 may linearly decrease a pulse width of the signal se0 during the period p25. For another example, the frequency controller 133 may non-linearly decrease a pulse width of the signal se0 during the period p25.

In the case in which an instruction is received, the display driver circuit 100 may repeatedly perform operation S570 and operation S580 until an instruction is received.

Figure 14:
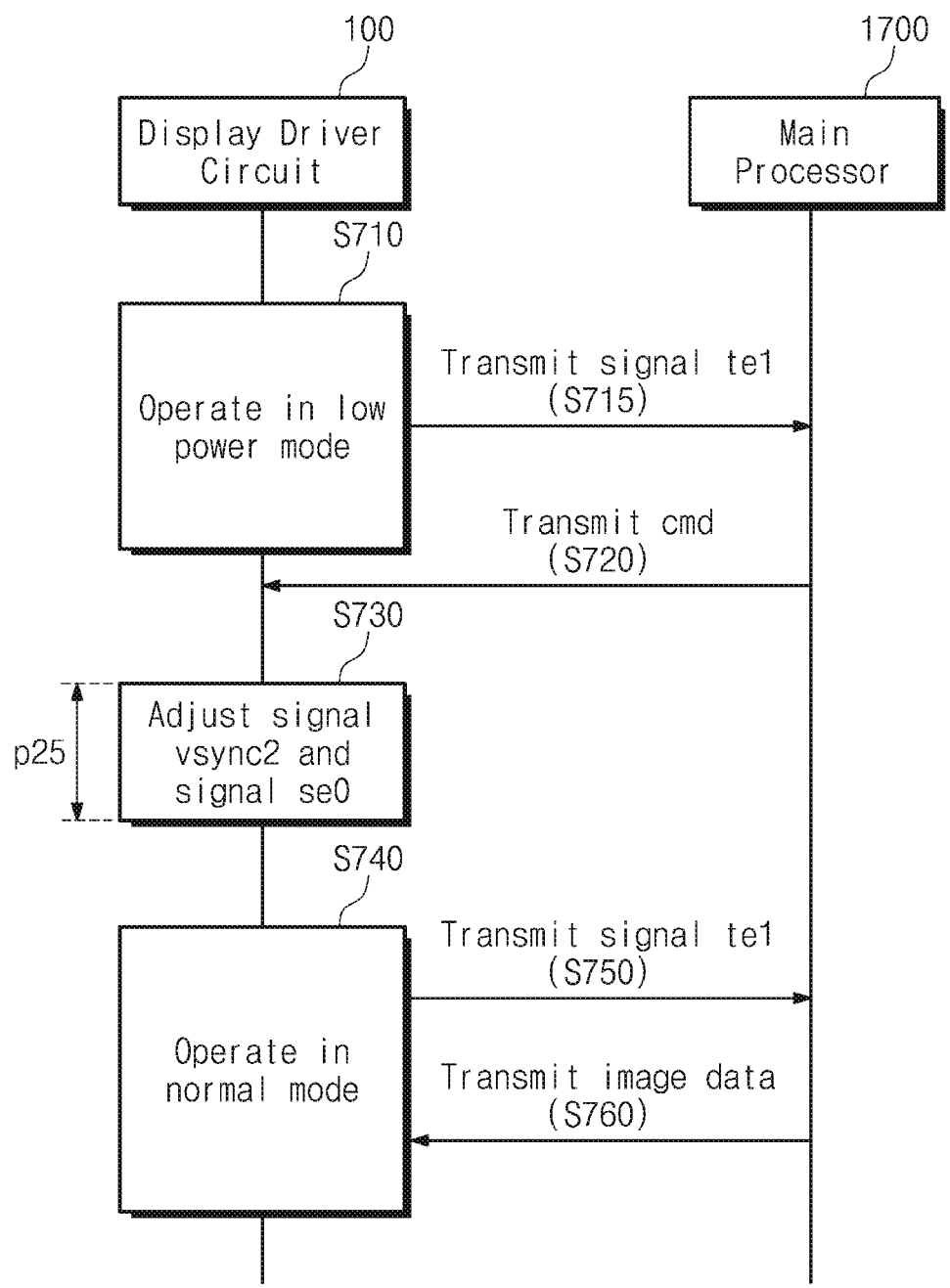
FIG. 14 is a flowchart for describing an operation of the display driver circuit described with reference to FIG. 12.

FIG. 14 is a flowchart for describing an operation of the display driver circuit 100 described with reference to FIG. 12.

In the following descriptions, operation S710 to operation S720 may indicate an operation that is performed in the period p24 of FIG. 12. Also, operation S730 may indicate an operation that is performed in the period p25 of FIG. 12. Operation S740 to operation S760 may indicate an operation that is performed in the period p22 of FIG. 12.

In operation S710, the display driver circuit 100 may operate in a low power mode. A frequency of the synchronization signal vsync2 in the low power mode may be lower than a frequency of the synchronization signal vsync2 in a normal mode.

In operation S715, the display driver circuit 100 may transmit the signal te1 to the main processor 1700.

In operation S720, the main processor 1700 may transmit an instruction or command (cmd) in response to the signal te1.

In operation S730, the display driver circuit 100 may receive the instruction. The display driver circuit 100 may adjust the signals vsync2 and se0 in response to the instruction. The signals vsync2 and se0 may be slowly adjusted during the period p25.

In operation S740, the display driver circuit 100 may operate in the normal mode.

In operation S750, the display driver circuit 100 may transmit the signal te1 to the main processor 1700.

In operation S760, the main processor 1700 may transmit new image data to the display driver circuit 100 in response to the signal te1. The display driver circuit 100 may receive new image data while operating in the normal mode.

According to an embodiment of the inventive concept, a display driver circuit may make a frame rate low while still image data are received, thus reducing power consumption.

The display driver circuit may turn off a source driver and/or a scan driver, thus reducing an analog power consumed in the source driver and/or the scan driver.

As is traditional in the field of the inventive concepts, the example embodiments are described, and illustrated in the drawings, in terms of functional blocks, units and/or modules. Those skilled in the art will appreciate that these blocks, units and/or modules are physically implemented by electronic (or optical) circuits such as logic circuits, discrete components, microprocessors, hard-wired circuits, memory elements, wiring connections, and the like, which may be formed using semiconductor-based fabrication techniques or other manufacturing technologies. In the case of the blocks, units and/or modules being implemented by microprocessors or similar, they may be programmed using software (e.g., microcode) to perform various functions discussed herein and may optionally be driven by firmware and/or software. Alternatively, each block, unit and/or module may be implemented by dedicated hardware, or as a combination of dedicated hardware to perform some functions and a processor (e.g., one or more programmed microprocessors and associated circuitry) to perform other functions. Also, each block, unit and/or module of the example embodiments may be physically separated into two or more interacting and discrete blocks, units and/or modules without departing from the scope of the inventive concepts. Further, the blocks, units and/or modules of the example embodiments may be physically combined into more complex blocks, units and/or modules without departing from the scope of the inventive concepts.

The various operations of methods described above may be performed by any suitable means capable of performing the operations, such as various hardware and/or software component(s), circuits, and/or module(s).

The software may include an ordered listing of executable instructions for implementing logical functions, and can be embodied in any "processor-readable medium" for use by or in connection with an instruction execution system, apparatus, or device, such as a single or multiple-core processor or processor-containing system.

The blocks or steps of a method or algorithm and functions described in connection with the example embodiments disclosed herein may be embodied directly in hardware, in a software module executed by a processor, or in a combination of the two. If implemented in software, the functions may be stored on or transmitted over as one or more instructions or code on a tangible, non-transitory computer-readable medium. A software module may reside in Random Access Memory (RAM), flash memory, Read Only Memory (ROM), Electrically Programmable ROM (EPROM), Electrically Erasable Programmable ROM (EEPROM), registers, hard disk, a removable disk, a CD ROM, or any other form of storage medium known in the art.

While the inventive concept has been described with reference to embodiments thereof, it will be apparent to those of ordinary skill in the art that various changes and modifications may be made thereto without departing from the spirit and scope of the inventive concept as set forth in the following claims.

What is claimed is:

1. A display driver circuit comprising:
   a source driver configured to output display data to data lines;
   a controller configured to control the source driver, based on a synchronization signal; and
   a frequency adjusting circuit configured to:
      extend a first time interval of the synchronization signal from a first length to a second length, such that time interval in which the display data is not output to the data lines is extended, when second image data are not received from an external device during a reference time interval after first image data are received from the external device; and
      shorten the first time interval, from the second length to a third length, when an instruction is received from the external device after the first time interval is extended to the second length.

2. The display driver circuit of claim 1, wherein the frequency adjusting circuit is further configured to:
   output the synchronization signal at a second time interval after the first time interval; and
   maintain the second time interval such that time interval at which the display data is output to the data lines is maintained.

3. The display driver circuit of claim 1, wherein the frequency adjusting circuit is further configured to shorten the first time interval of the synchronization signal, from the second length to the third length, before the second image data are received based on the instruction.

4. The display driver circuit of claim 1, wherein the third length is identical to the first length.

5. The display driver circuit of claim 1, wherein the frequency adjusting circuit is further configured to receive the instruction, and wherein the instruction is generated based on touch event of a touch panel.

6. The display driver circuit of claim 1, wherein the frequency adjusting circuit is further configured to shorten the first time interval from the second length to the third length based on the instruction before the second image data are received from the external device.

7. The display driver circuit of claim 6, wherein the frequency adjusting circuit is further configured to:
   extend the first time interval from the first length to the second length by a first fixed length; and
   shorten the first time interval from the second length to the third length by a second fixed length.

8. A display driver circuit comprising:
   a source driver configured to output display data to data lines connected to pixels;
   a controller configured to control the source driver, based on a synchronization signal;
   a power controller configured to turn off the source driver during a first time interval, based on the synchronization signal; and
   a frequency adjusting circuit configured to:
      increase a period of the synchronization signal, from a first value to a second value, such that the first time interval is extended, when second image data are not received from an external device during a reference time interval after first image data are received from the external device; and
      reduce the period of the synchronization signal, from the second value to a third value, when the second image data are received from the external device.

9. The display driver circuit of claim 8, wherein, when the source driver is turned off, a power that is supplied to the source driver is shut off.

10. The display driver circuit of claim 8, wherein the power controller is further configured to turn on the source driver during a second time interval, based on the synchronization signal.

11. The display driver circuit of claim 10, wherein the source driver is further configured to not output the display data in the first time interval and output the display data in the second time interval.

12. The display driver circuit of claim 8, further comprising a scan driver configured to drive scan lines connected to the pixels,
   wherein the power controller is further configured to turn off the scan driver during the first time interval, based on the synchronization signal.

13. The display driver circuit of claim 8, wherein the frequency adjusting circuit is further configured to generate an emission signal such that a period of emission of a light from each of the pixels is maintained regardless of the period of the synchronization signal.

14. The display driver circuit of claim 13, wherein the period of the emission is associated with a quality of an image that is displayed in a display panel, based on the display data.

15. A display driver circuit comprising:
   a source driver configured to output display data to data lines;
   a controller configured to control the source driver, based on a synchronization signal; and
   a frequency adjusting circuit configured to:
      lower a frequency of the synchronization signal, from a first value to a second value, when second image data are not received from an external device during a reference time interval after first image data are received from the external device;
      increase the frequency of the synchronization signal, from the second value to a third value, when the second image data are received from the external device; and
      adjust the frequency of the synchronization signal, such that time interval in which the display data are output is maintained.

16. The display driver circuit of claim 15, wherein the frequency adjusting circuit is further configured to lower the frequency of the synchronization signal, such that time interval in which the display data are not output is extended.

17. The display driver circuit of claim 15, wherein the frequency adjusting circuit comprises:
   a counter configured to count the time interval that the second image data are not received after the first image data are received from the external device;
   a comparator configured to compare the time interval with the reference time interval; and
   a frequency controller configured to adjust the frequency of the synchronization signal, based on a comparison result in the comparator.

18. The display driver circuit of claim 15, wherein the third value is identical to the first value.

19. The display driver circuit of claim 15, wherein the frequency adjusting circuit is further configured to output a touch signal to a touch circuit at a frequency higher than the second value.

20. The display driver circuit of claim 19, wherein the frequency adjusting circuit is further configured to increase the frequency of the synchronization signal, from the second value to the third value, when a instruction received from the touch circuit, and
   wherein the instruction is generated based on touch event of a touch panel.

* * * * *